US009577532B2

(12) United States Patent
Tournatory et al.

(10) Patent No.: US 9,577,532 B2
(45) Date of Patent: Feb. 21, 2017

(54) SWITCHING REGULATOR CIRCUITS AND METHODS

(71) Applicant: GAZELLE SEMICONDUCTOR, INC., Redwood City, CA (US)

(72) Inventors: David Christian Gerard Tournatory, Redwood City, CA (US); Nicolas Stephane Monier, San Francisco, CA (US)

(73) Assignee: Gazelle Semiconductor, Inc., Sunnyvale, CA (US)

( * ) Notice: Subject to any disclaimer, the term of this patent is extended or adjusted under 35 U.S.C. 154(b) by 243 days.

(21) Appl. No.: 14/315,682

(22) Filed: Jun. 26, 2014

(65) Prior Publication Data

US 2015/0028832 A1    Jan. 29, 2015

Related U.S. Application Data

(60) Provisional application No. 61/858,503, filed on Jul. 25, 2013, provisional application No. 61/907,285, filed on Nov. 21, 2013.

(51) Int. Cl.
*H02M 3/158* (2006.01)
*H02M 1/00* (2006.01)

(52) U.S. Cl.
CPC ... *H02M 3/1584* (2013.01); *H02M 2001/0032* (2013.01); *Y02B 70/16* (2013.01)

(58) Field of Classification Search
CPC ...... H02M 3/155; H02M 3/156; H02M 3/158; H02M 3/1584; H02M 2001/0032
USPC .......................... 323/234, 265, 268, 271, 272
See application file for complete search history.

(56) References Cited

U.S. PATENT DOCUMENTS

| | | | |
|---|---|---|---|
| 4,673,889 A | 6/1987 | Cini et al. | |
| 5,418,707 A | 5/1995 | Shimer et al. | |
| 5,570,276 A | 10/1996 | Cuk et al. | |
| 5,581,451 A | 12/1996 | Ochiai | |
| 5,592,071 A | 1/1997 | Brown | |
| 5,615,093 A | 3/1997 | Nalbant | |
| 5,770,940 A | 6/1998 | Goder | |
| 5,929,692 A | 7/1999 | Carsten | |
| 6,043,634 A * | 3/2000 | Nguyen | H02M 3/1584 323/272 |

(Continued)

FOREIGN PATENT DOCUMENTS

| | | |
|---|---|---|
| EP | 1172924 A3 | 2/2002 |
| EP | 2002558 B1 | 9/2011 |

(Continued)

OTHER PUBLICATIONS

Josh Wibben et al, "A High-Efficiency DC—DC Converter Using 2 nH Integrated Inductors", IEEE Journal of Solid-State Circuits, Jul. 7, 2007, pp. 844-854, vol. 43, No. 4.

(Continued)

*Primary Examiner* — Jessica Han
*Assistant Examiner* — David A. Singh

(57) ABSTRACT

A switching regulator circuit can include multiple switching regulator stages coupled to an output. A first switching regulator stage may be operated at a different frequency than a second switching regulator stage. In some cases, one switching regulator stage is operated at a different duty cycle. The switching regulator circuit may also include multiple switching regulator stages that cancel ripple at an output node.

37 Claims, 16 Drawing Sheets

(56) References Cited

U.S. PATENT DOCUMENTS

| | | | |
|---|---|---|---|
| 6,208,945 B1* | 3/2001 | Koda | G01R 23/20 324/620 |
| 6,396,137 B1 | 5/2002 | Klughart | |
| 6,674,274 B2* | 1/2004 | Hobrecht | H02J 1/102 323/268 |
| 6,683,441 B2* | 1/2004 | Schiff | H02M 3/1584 323/222 |
| 6,894,464 B2 | 5/2005 | Zhang | |
| 6,940,736 B2* | 9/2005 | Jonsson | H02M 3/1584 363/71 |
| 6,965,219 B2* | 11/2005 | Brooks | H02M 3/1584 323/272 |
| 6,979,980 B1* | 12/2005 | Hesterman | H02M 3/07 323/222 |
| 6,987,380 B1 | 1/2006 | Lee | |
| 7,071,662 B2* | 7/2006 | Hsu | H02M 3/1584 323/272 |
| 7,215,102 B2* | 5/2007 | Harris | H02M 3/1584 323/268 |
| 7,250,746 B2 | 7/2007 | Oswald et al. | |
| 7,301,317 B1* | 11/2007 | Mattingly | H02M 3/1584 323/282 |
| 7,432,614 B2 | 10/2008 | Ma et al. | |
| 7,486,060 B1 | 2/2009 | Bennett | |
| 7,499,682 B2 | 3/2009 | Rozenblit et al. | |
| 7,538,535 B2 | 5/2009 | McDonald et al. | |
| 7,730,340 B2 | 6/2010 | Hu et al. | |
| 8,063,619 B2* | 11/2011 | Zhu | H02J 7/32 323/266 |
| 8,085,020 B1 | 12/2011 | Bennett | |
| 8,188,721 B2* | 5/2012 | Isham | H02M 3/156 323/282 |
| 8,248,152 B2 | 8/2012 | Dennard et al. | |
| 8,319,485 B2* | 11/2012 | Philpott | H02M 1/44 323/282 |
| 8,704,500 B2* | 4/2014 | Xiao | H02M 3/1584 323/272 |
| 8,836,306 B2* | 9/2014 | Khanna | H02M 3/1584 323/272 |
| 9,086,707 B2* | 7/2015 | Zhao | G05F 1/10 |
| 2005/0007086 A1 | 1/2005 | Morimoto | |
| 2005/0088151 A1* | 4/2005 | Tzeng | H02M 3/156 323/268 |
| 2005/0200404 A1 | 9/2005 | Bernardon | |
| 2007/0195876 A1 | 8/2007 | Prodic | |
| 2008/0197827 A1 | 8/2008 | Wrathall | |
| 2011/0204862 A1 | 8/2011 | Prodic et al. | |
| 2011/0316502 A1* | 12/2011 | Tang | H02M 3/156 323/271 |
| 2012/0161740 A1* | 6/2012 | Vogman | H02M 3/156 323/286 |
| 2012/0274300 A1* | 11/2012 | Nakashima | H02M 3/156 323/284 |
| 2013/0043847 A1* | 2/2013 | Kim | H02M 1/4225 323/207 |
| 2013/0200849 A1 | 8/2013 | Crebier et al. | |
| 2013/0214752 A1 | 8/2013 | Tournatory | |
| 2013/0214858 A1 | 8/2013 | Tournatory et al. | |
| 2013/0293207 A1* | 11/2013 | Wei | G05F 1/46 323/272 |
| 2013/0308061 A1* | 11/2013 | Murakami | H02M 3/1582 348/730 |
| 2014/0049235 A1 | 2/2014 | Li et al. | |
| 2014/0132232 A1* | 5/2014 | MacLean | G05F 1/62 323/271 |
| 2014/0177768 A1* | 6/2014 | van der Goes | H04L 27/0002 375/349 |
| 2014/0333281 A1* | 11/2014 | Li | G06F 1/3203 323/318 |
| 2014/0375288 A1* | 12/2014 | Nora | H02M 3/1584 323/272 |

FOREIGN PATENT DOCUMENTS

| | | |
|---|---|---|
| EP | 2493060 A1 | 8/2012 |
| WO | 2009067591 A2 | 5/2009 |
| WO | 2011128849 A2 | 10/2011 |
| WO | 2013122782 A1 | 8/2013 |

OTHER PUBLICATIONS

International Search Report (from a corresponding foreign application), PCT/US2014/45812, mailed Dec. 5, 2014.
International Search Report (from a corresponding foreign application), PCT/US2013/078355, mailed Apr. 8, 2014.
International Search Report and Written Opinion—PCT/US2014/65917—ISA/US—Feb. 11, 2015.

* cited by examiner

STEADY-STATE CURRENT RIPPLE CANCELLATION
PHASES RUNNING WITH SAME DUTY-CYCLE

# SWITCHING REGULATOR CIRCUITS AND METHODS

CROSS-REFERENCE TO RELATED APPLICATIONS

This application claims priority to U.S. Provisional Patent Application Ser. No. 61/858,503, filed Jul. 25, 2013 the contents of which are hereby incorporated by reference herein in its entirety. This application claims priority to U.S. Provisional Patent Application Ser. No. 61/907,285, filed Nov. 21, 2013 the contents of which are hereby incorporated by reference herein in its entirety.

BACKGROUND

The present disclosure relates to switching regulator circuits and methods.

Regulator circuits are used to provide voltage and current in a wide variety of applications. One type of regulator circuit is a switching regulator. Switching regulators typically include switching circuits that selectively couple voltage and current to an inductor. Energy is stored in the inductor and then translated to different voltage and current levels according to system needs. For example, one example switching regulator (e.g., a "Buck" regulator or "down converter") may receive 10 volts and 1 ampere ("amp") of current from a power supply and generate 1 volt at approximately 10 amps.

Systems on a Chip (SoCs), processors (e.g., CPUs and GPUs), memories, and other complex digital information processing systems are sometimes composed of several voltage domains, such as V_Core(s), V_DDR, V_Serdes, V_Memory, etc. Providing power to these different voltage domains can be challenging because of the strict requirements of these systems, such as limitations on voltage variation and current load and load step requirements, for example. Powering up these voltage domains with independent voltage regulators featuring a high slew capability present several advantages. First, it allows optimization of the voltage of each power domain according to the power need of a particular power domain at any given point of time. Having voltage regulators with fast slew capabilities presents the advantage to track the workload of each power domain in real time or quasi real time, therefore keeping supply voltage always near a minimum and significantly reducing power consumption. It also allows the power domains to be fully powered down independently without relying on inefficient headers or power switches in the SoCs, CPUs or GPUs, for example.

In some applications it may also be advantageous to integrate one or more voltage regulators inside a digital integrated circuit (IC) package to reduce the system integration complexity at board level, reduce the number of inputs and outputs (IOs), and/or reduce the input current of a digital IC. However, package integration of a voltage regulator inside a package is challenging because of the limited space inside the package. Building an efficient and effective regulator that can fit inside a package and meet the stringent requirements that are often associated with complex digital ICs remains a challenge. The industry needs fast, highly efficient, and very small footprint voltage regulators that can be integrated in the package of modern SoCs, CPUs, GPUs, and other digital ICs.

Therefore, it would be advantageous to overcome the limitations of existing switching regulator technology.

SUMMARY

The present disclosure includes circuits and methods for switching regulators that meet a variety of industrial needs. The present disclosure includes switching regulator circuits and methods. In one embodiment, multiple switching regulator stages are coupled to an output. A first switching regulator stage is operated at a different frequency than a second switching regulator stage. In another embodiment, one switching regulator stage is operated at a different duty cycle. Embodiments of the present disclosure may include multiple switching regulator stages that cancel ripple at an output node.

The following detailed description and accompanying drawings provide a better understanding of the nature and advantages of the present disclosure.

DETAILED DESCRIPTION

The present disclosure pertains to switching regulator circuits and methods. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
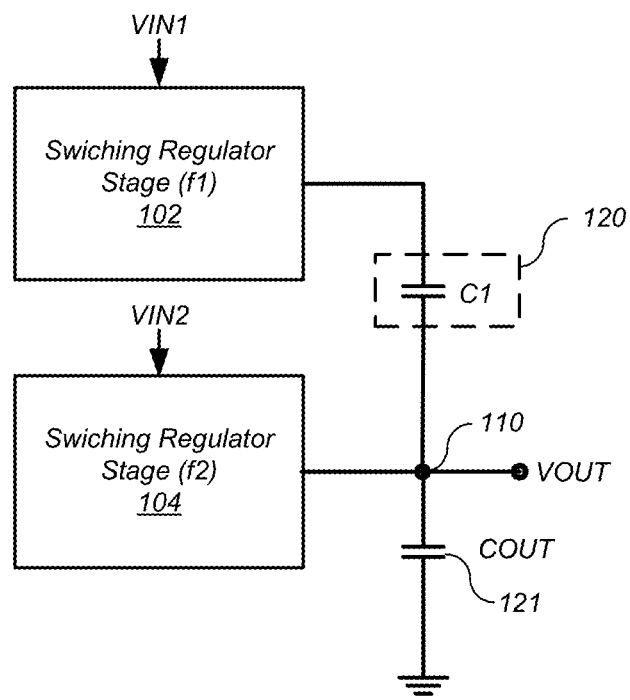
FIG. 1 illustrates a switching regulator topology according to one embodiment.

FIG. 1 illustrates a switching regulator topology according to one embodiment. Embodiments of the present disclosure include switching regulator circuits and methods including first and second portions (stages) 102 and 104 that operate at different frequencies. Switching regulator stage 102 may receive an input voltage VIN1 and switching regulator stage 104 may receive an input voltage VIN2, and the stages work together to produce a regulated output voltage VOUT on output node 110. Output capacitor 121, COUT, may store VOUT, for example. VIN1 and VIN2 may be the same voltage, such as a supply voltage Vdd, but in other embodiments VIN1 and VIN2 may be coupled to different supply voltages. For example, in some embodiments VIN1 may be less than VIN2, which allows use of lower breakdown devices (e.g., FETs) in the high frequency AC stage to improve efficiency. Switching regulator stage 102 may operate at a first frequency, f1, and switching regulator stage 104 may operate at a second frequency, f2. As illustrated by further examples and embodiments below, a first switching regulator stage 102 may include a plurality of switches and an inductor, and a second switching regulator stage 104 may include another plurality of switches and another inductor. An output node 110 is coupled to an output of switching regulator stage 102 and an output of switching regulator stage 104. Example embodiments may include switches (e.g., transistors) in stage 102 having higher switching frequencies than switches in stage 104, wherein VIN1 and ground may be alternately coupled to an inductor in stage 102 at a higher frequency than VIN2 and ground are alternately coupled to an inductor in stage 104, for example. A variety of advantages are obtained when the first switching regulator stage 102 operates at a different frequency than the second switching regulator stage 104. As shown in FIG. 1, the switching regulator topology may also include, in some embodiments, a capacitor between the output of switching regulator stage 102 and the output of switching regulator stage 104 so that the outputs of the two switching regulator stages may advantageously operate at different voltages and duty cycles.

Features and advantages of the present disclosure include switching regulator architectures having multiple stages that may also produce different currents and, in some embodiments, different duty cycles. One stage of the circuit may additionally cancel (at least partially) the ripple of a second stage of the circuit, for example. In some embodiments described further below, both stages are on during high current loads and one stage is turned off during light current loads. In one example implementation described below, summed triangle waves are used to produce a modulated triangle wave in one stage to cancel ripple in another stage. Examples below show how different embodiments of the switching regulator stages operate with and without a capacitor 120.

Figure 2:
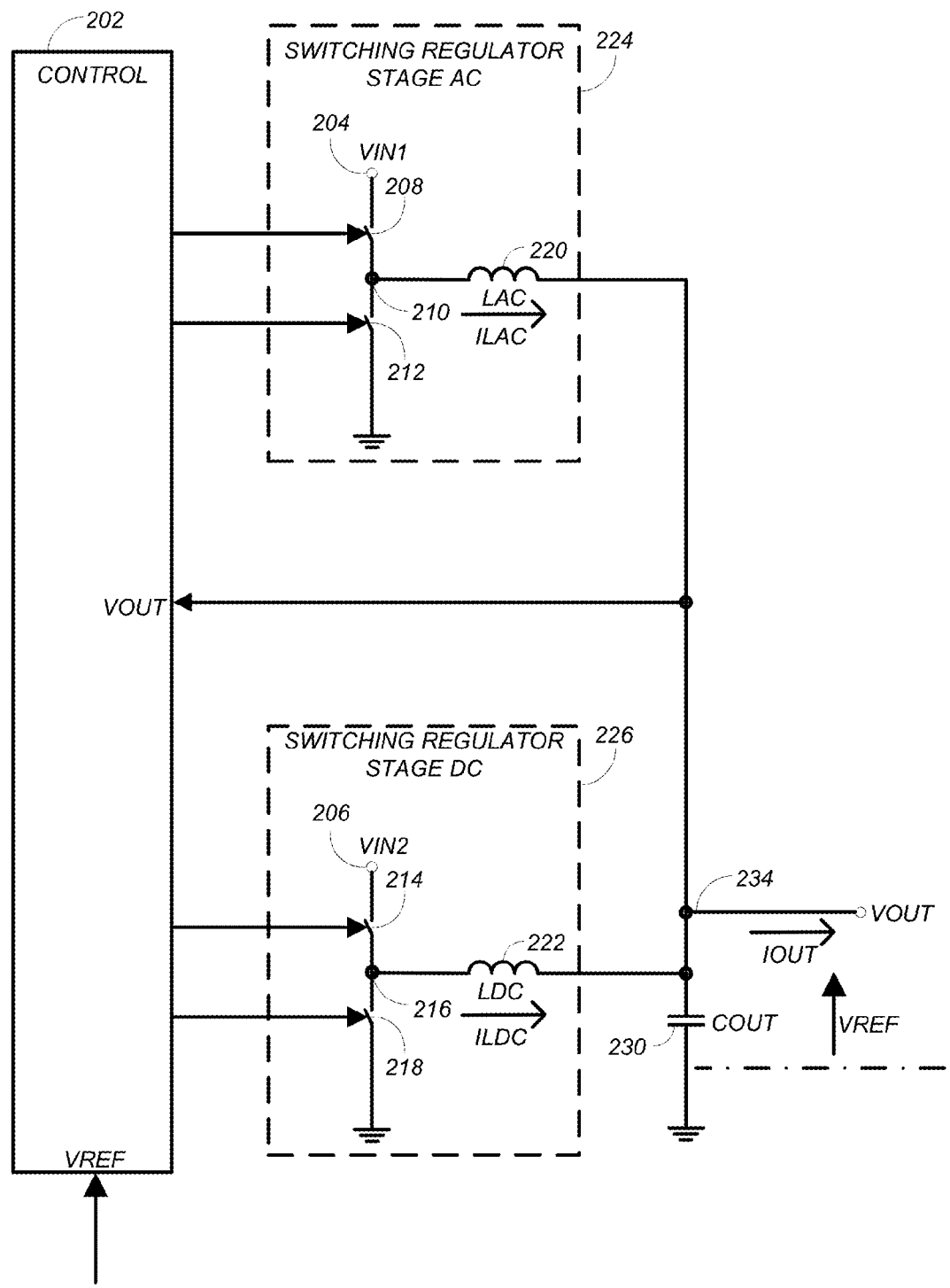
FIG. 2 illustrates a switching regulator according to one embodiment.

FIG. 2 illustrates a switching regulator according to one embodiment. FIG. 2 shows one approach for coupling together two switching regulator stages (phases) operating at different switching frequencies to form a voltage regulator. In some embodiments described in more detail below, the switching regulator stages may be designed for different values of inductance and power switch sizes, for example. A stage (or phase) may refer to a portion of a regulator having a switching section and an output inductor, for example. The term switching regulator phase and switching regulator stage are used interchangeably herein.

In this example embodiment, a first switching regulator stage 224 may have two output switches (e.g., transistors, such as MOSFETs) 208 and 212 to selectively couple a switching node 210 to either an input voltage, VIN1, received at terminal 204 or ground, for example. A second switching regulator stage 226 likewise may have two output switches (e.g., transistors, such as MOSFETs) 214 and 218 to selectively couple a switching node 216 to either an input voltage, VIN2, received at terminal 206 or ground, for example. In some embodiments, VIN1 and VIN2 may be the same voltage. In other embodiments, VIN1 and VIN2 may be different voltages as mentioned above. Switching regulator stages may also include driver circuits (not shown) to generate signals to turn the switches ON (i.e., switch closed) or OFF (i.e., switch open). As switches 208 and 212 are turned ON and OFF, a current ILAC is established in inductor 220 (LAC) having a terminal coupled to the switching node 210 and a terminal coupled to the output of switching regulator stage 224. Similarly, as switches 214 and 218 are turned ON and OFF, a current ILDC is established in inductor 222 (LDC) having a terminal coupled to the switching node 216 and a terminal coupled to the output of switching regulator stage 226.

In this example, the output of switching regulator stage 224 (referred to as the AC stage or AC phase) and the output of switching regulator stage 226 (referred to as the DC stage or DC phase) are coupled to output node 234 for providing a switching regulator output voltage VOUT. The regulator may include a control circuit 202 that senses VOUT as a feedback signal input and generates the signals for turning the switches in each stage ON and OFF to maintain VOUT at a regulated value. For example, control circuit 202 may receive a reference voltage VREF that sets VOUT. In some example embodiments VOUT may be equal to VREF or related to VREF (e.g., a fraction or multiple of VREF). An output capacitor 230 (COUT) is coupled between output node 234 and ground. A load (not shown) may be coupled to output node 234, for example, which may receive a power supply voltage VOUT from the regulator and draw a current IOUT.

When VIN1=VIN2, the duty cycle of an example regulator in FIG. 2 is related to input voltage VIN and output voltage VOUT as follows:

$$DC=VOUT/VIN.$$

Accordingly, in this example the AC stage 224 and DC stage 226 have the same duty cycle because they have the same VIN and VOUT.

Figure 3:
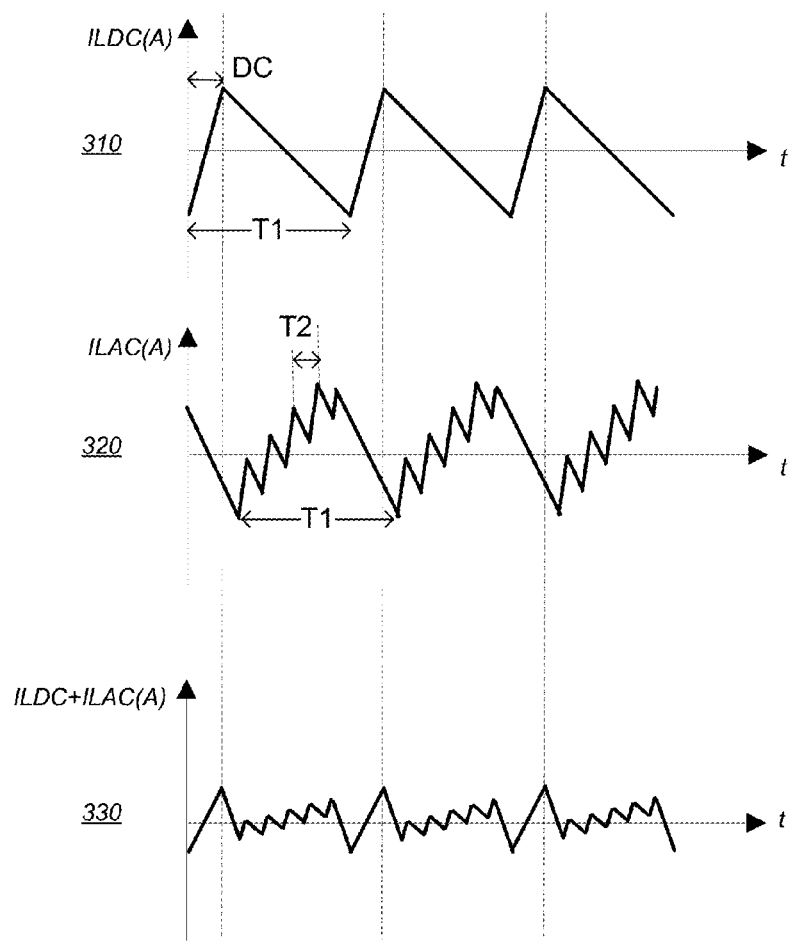
FIG. 3 illustrates ripple cancellation using the switching regulator topology shown in FIG. 2.

Example embodiments of the present disclosure include a switching regulator having multiple switching stages that may operate at different switching frequencies with reduced output ripple. FIG. 3 illustrates ripple cancellation using the switching regulator topology shown in FIG. 2. In this example, switching regulator stage 224 of FIG. 2 may operate at a first frequency greater than the frequency of operation of switching regulator 226. Stage 224 in FIG. 2 may further have a smaller inductance current ILDC than the inductance current ILDC in stage 226.

Inductor current ILDC of stage 226 is shown at 310 in FIG. 3. During each cycle, the current ramps up when switch 214 is closed and switch 218 is open, and ILDC ramps down when switch 218 is closed and switch 214 is open. Typically, the ramping up and down of inductor current causes a ripple current and ripple voltage on output node VOUT. The point during a cycle where the switches 214 and 218 change state and the current ramp changes direction is set by the duty cycle, DC, as shown at 310. The duration (or period, T1) of the cycles corresponds to the frequency. Accordingly, stage 226 has a longer period than stage 224, which has a higher frequency.

Inductor current ILAC of stage 224 is shown at 320. As illustrated at 320, features and advantages of the present disclosure include an inductor current ILAC that may be configured to cancel the ripple of inductor current ILDC. ILAC includes a high switching frequency component having a period T2 ramping up and down similar the current ramps in ILDC. However, in addition to the high frequency ramps, ILAC is modulated with a second low frequency component having period T1, which is substantially the same frequency as ILDC, but with an opposite polarity. For instance, when the DC stage ramps ILDC up, the low frequency component of the AC stage is ramping ILAC down, and when the DC stage ramps ILDC down, the low frequency component of the AC stage is ramping ILAC up. Currents from the switching regulator stages are combined at the output node 234. Thus, as ILDC is ramping down, a low frequency component of the ILAC current is ramping up to cancel ILDC. Similarly, as ILDC is ramping up, the low frequency component of ILAC is ramping down to cancel ILDC. An example of combined current ripple of the switching regulator stages (ILDC+ILAC) is illustrated at 330. In this example, modulating the high frequency stage 224 output current at approximately the switching frequency of the low frequency stage 226, but with an opposite polarity, results in cancellation of the low frequency current waveforms and reduction of the ripple current. Reduction of the ripple current, in turn, reduces the ripple voltage on VOUT.

Figure 4:
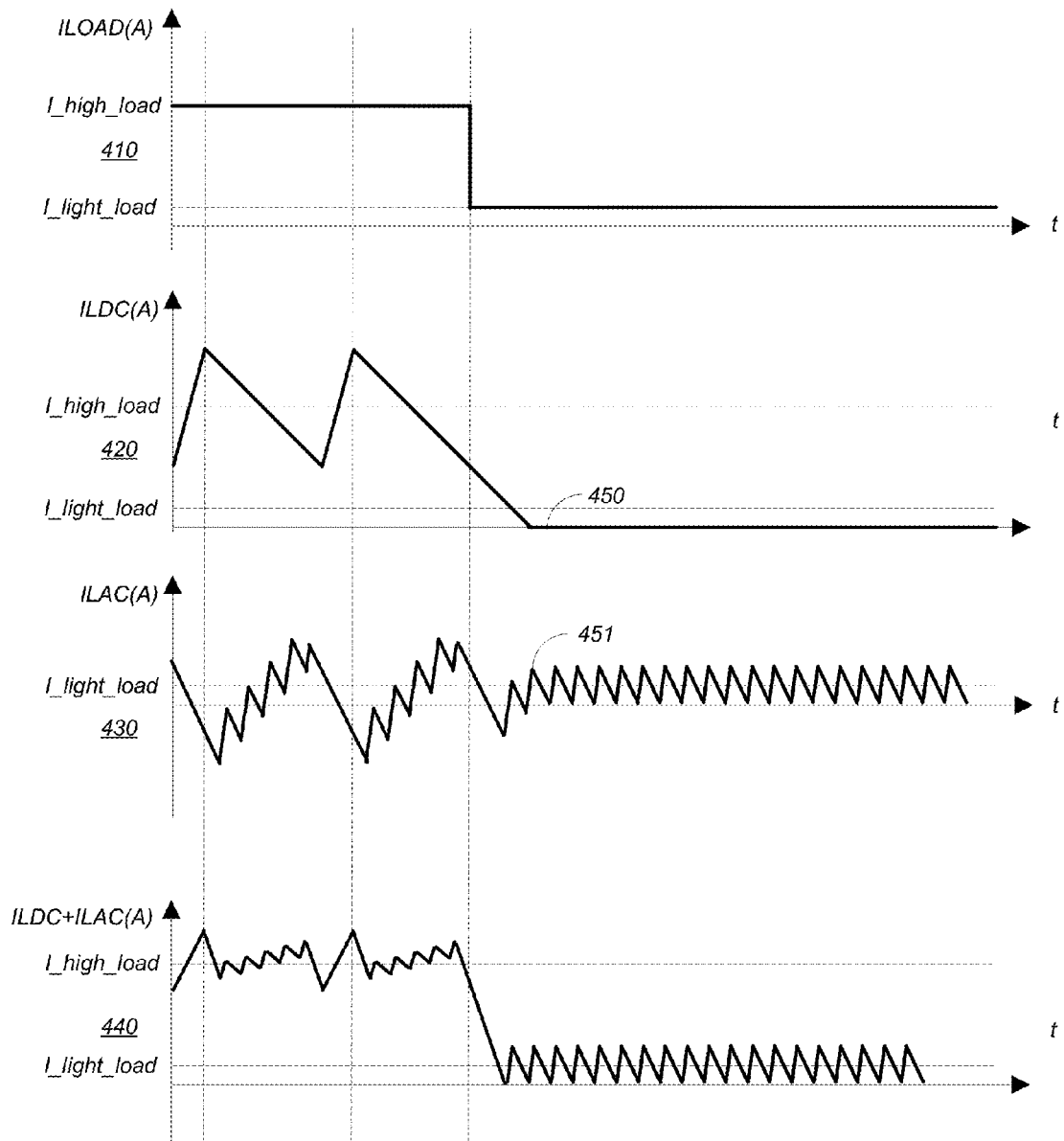
FIG. 4 illustrates a current step for an example voltage regulator using the switching regulator topology shown in FIG. 2.

FIG. 4 illustrates a current step for an example voltage regulator using the switching regulator topology shown in FIG. 2. In this example, a voltage regulator transitions from a heavy load (high load) to a light load at 410. While the load is high, the DC stage supports the DC current and the AC stage cancels the current ripple of the DC stage as shown at 420 and 430. In some example applications, embodiments of the present disclosure may turn off one stage when a load current is below a threshold. For example, when the load is light (less than some threshold) the DC stage may be disabled as illustrated at 450, and the AC may support the light load current. During this period, the low frequency component of the AC current is turned off, and the current from the AC stage is used to regulate the output voltage using only a high switching frequency component as illustrated at 451. The combined currents at the output are illustrated at 440 for both high and light load current.

Figure 5:
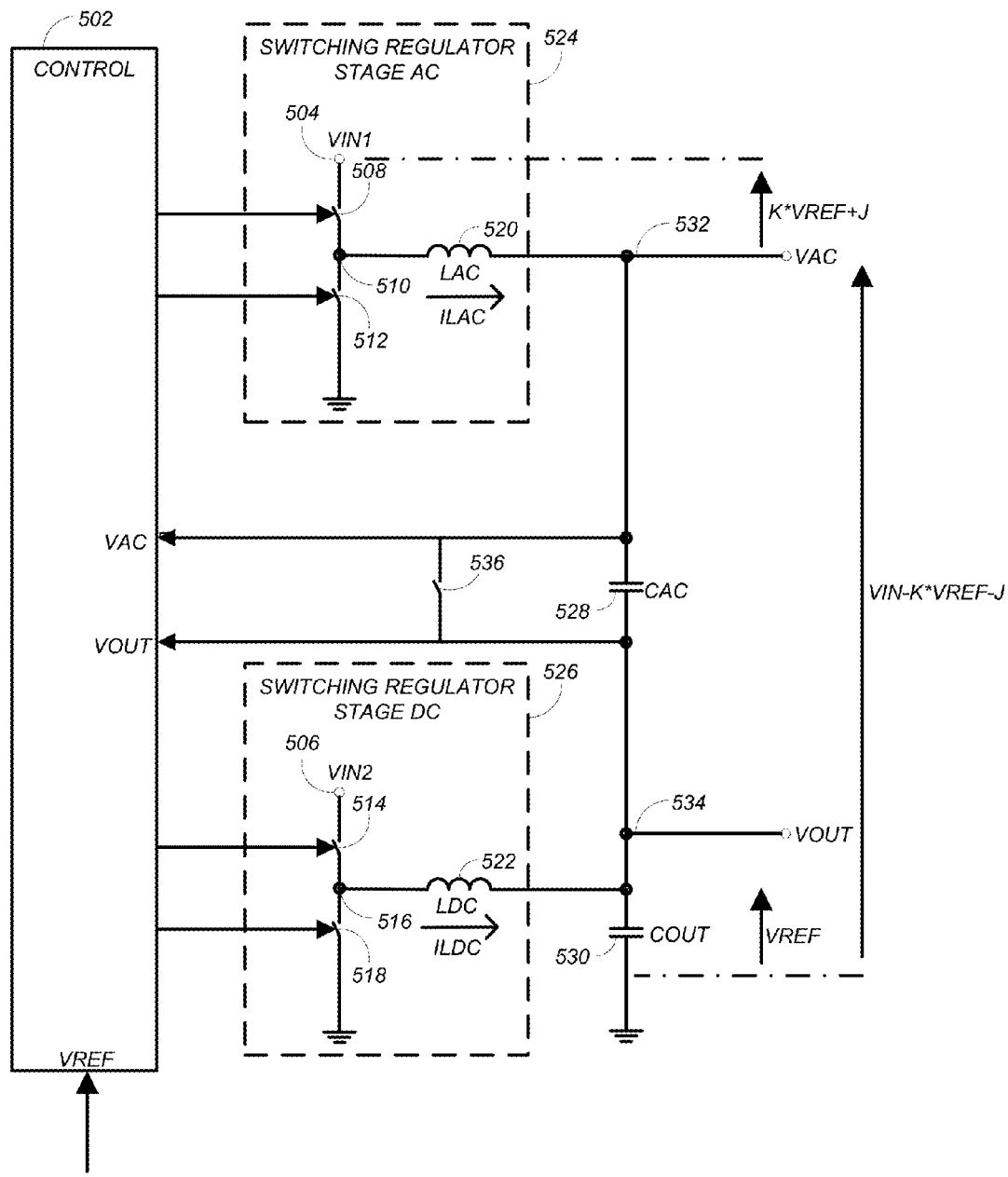
FIG. 5 illustrates a switching regulator according to another embodiment.

FIG. 5 illustrates a switching regulator according to another embodiment. FIG. 5 shows another approach for coupling together two switching regulator stages (phases) operating at different switching frequencies to form a voltage regulator. In this example, outputs of switching regulator stages are coupled together through a coupling capacitor 528 (CAC). In this example, CAC capacitor allows one switching regulator stage 524 to operate at a different output voltage than another switching regulator stage 526. Accordingly, stage 524 may have a different duty cycle than stage 526.

In this example embodiment, a first switching regulator stage 524 may have two output switches (e.g., transistors, such as MOSFETs) 508 and 512 to selectively couple a switching node 510 to either an input voltage, VIN1, received at terminal 504 or ground, for example. A second switching regulator stage 526 likewise may have two output switches (e.g., transistors, such as MOSFETs) 514 and 518 to selectively couple a switching node 516 to either an input voltage, VIN2, received at terminal 506 or ground, for example. In some embodiments, VIN1 and VIN2 may be the same voltage. In other embodiments, VIN1 and VIN2 may be different voltages as mentioned above. Switching regulator stages may also include driver circuits (not shown) to generate signals to turn the switches ON (i.e., switch closed) or OFF (i.e., switch open). As switches 508 and 512 are turned ON and OFF, a current ILAC is established in inductor 520 (LAC) having a terminal coupled to the switching node 510 and a terminal coupled to the output of switching regulator stage 524. Similarly, as switches 514 and 518 are turned ON and OFF, a current ILDC is established in inductor 522 (LDC) having a terminal coupled to the switching node 516 and a terminal coupled to the output of switching regulator stage 526.

In this example, the output of switching regulator stage 524 (referred to as the AC stage or AC phase) and the output of switching regulator stage 526 (referred to as the DC stage or DC phase) are coupled together through CAC capacitor 528. Accordingly, the output of AC stage 524 at node 532 has a first voltage VAC, and the output of the DC stage 526 at output node 534 provides a switching regulator output voltage VOUT. The regulator may include a control circuit 502 that senses VOUT and VAC as separate feedback signal inputs, for example, and generates the signals for turning the switches in each stage ON and OFF to maintain VOUT and VAC at particular regulated values. For example, control circuit 502 may receive a reference voltage VREF that sets VOUT. VAC may be set at a variety of voltage levels. VAC may be related to VOUT (e.g., VAC=K*VREF+J) or set independent of VOUT, for example. As illustrated in examples below, particular embodiments may include different reference voltages, VREF1 and VREF2, for regulating VOUT and VAC at different levels. An output capacitor 530 (COUT) is coupled between output node 534 and ground. A load (not shown) may be coupled to output node 534, for example, which may receive a power supply voltage VOUT from the regulator and draw a current IOUT.

When VIN1=VIN2=VIN, the example regulator in FIG. 5 may include two different duty cycles, including a duty cycle of the AC stage 524, DC1, and a duty cycle of the DC stage 526, DC2. The DC stage duty cycle, DC2, is related to input voltage VIN and output voltage VOUT as follows:

$$DC2=VOUT/VIN.$$

The AC stage duty cycle, DC1 is related to the input voltage and voltage on node 532, VAC, as follows:

$$DC1=VAC/VIN.$$

Accordingly, in this example the AC stage 524 and DC stage 526 may operate at different frequencies and have different duty cycles because they may have different output voltages VAC and VOUT. The operation of a switching regulator with AC and DC stages is described in commonly owned U.S. patent application Ser. No. 14/144,169, entitled "SWITCHING REGULATOR CIRCUITS AND METHODS," naming David Christian Gerard Tournatory and Kevin Kennedy Johnstone as inventors, the content of which is hereby incorporated herein by reference in its entirety.

FIG. 5 further illustrates a feature that may be included in some example embodiments. Switch 536 may be included having a first terminal coupled to the output of AC stage 524 and a second terminal coupled to the output node 534. When the load current drops below a particular current threshold, DC stage 526 may be turned off and switch 536 may be closed by a digital control signal, for example, to drive the output node 534 of the regulator directly using the AC stage. The switches 508, 512, 514, and 518 may be implemented as MOS transistors (i.e., FETs). The AC stage may have smaller sized FETs than the DC stage, resulting in higher efficiency when using the AC stage at light loads. In one embodiment, the switching frequency of the AC stage is decreased from a first frequency to a second frequency (e.g., 30 MHz to 15 MHz) when the load current drops below a threshold and the DC stage is disabled to improve light load efficiency of the regulator.

Figure 6:
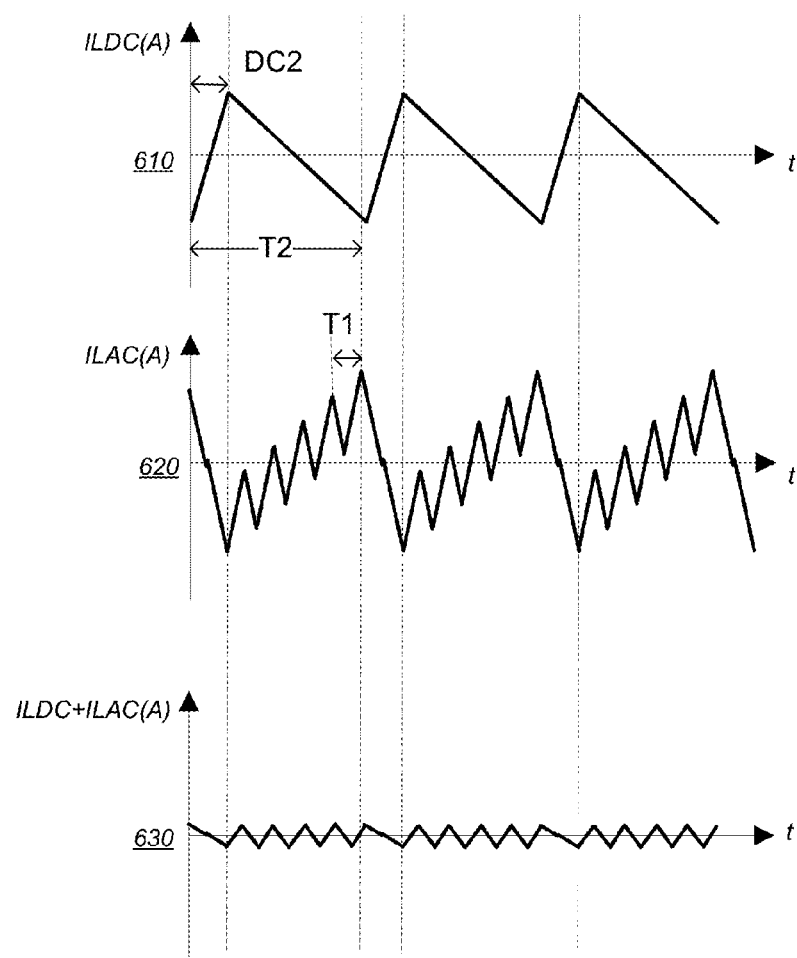
FIG. 6 illustrates ripple cancellation using the switching regulator topology shown in FIG. 5.

Example embodiments of the present disclosure include a switching regulator having multiple switching stages that may operate at different frequencies and different duty cycles with reduced output ripple. FIG. 6 illustrates ripple cancellation using the switching regulator topology shown in FIG. 5. In this example, switching regulator stage 524 of FIG. 5 may operate at a first frequency greater than the frequency of operation of switching regulator 526. Stage 524 in FIG. 5 may further have a smaller inductance current ILAC than the inductance current ILDC in stage 526.

Inductor current ILDC of stage 526 is shown at 610 in FIG. 6. During each cycle, the current ramps up when switch 514 is closed and switch 518 is open, and ILDC ramps down when switch 518 is closed and switch 514 is open. Typically, the ramping up and down of inductor current causes a ripple current and ripple voltage on output node VOUT. The point during a cycle where the switches 514 and 518 change state and the current ramp changes direction is set by the duty cycle, DC2, as shown at 610. The duration (or period, T2) of the cycles sets the frequency.

Inductor current ILAC of stage 624 is shown at 620. As illustrated at 620, features and advantages of the present disclosure include an inductor current ILAC that may be configured to cancel inductor current ILDC. ILAC includes a high frequency component ramping up and down similar the current ramps in ILDC. The high frequency ramps have a duration (or period) T1, where period, T=1/frequency. The high frequency component of the AC stage 524 output current is greater than the frequency of the DC stage 526 output current. Accordingly, the current cycles in stage 526 have a longer period than the current cycles in stage 524, which operates at a higher switching frequency. However, in addition to the high frequency ramps, ILAC is modulated with a second low frequency component having substantially the same frequency as ILDC, but with an opposite polarity. For instance, when the DC stage ramps ILDC up, the low frequency component of the AC stage is ramping ILAC down, and when the DC stage ramps ILDC down, the low frequency component of the AC stage is ramping ILAC up. Currents from the switching regulator stages are combined at the output node 534. Thus, as ILDC is ramping down, a low frequency component of the ILAC current is ramping up to cancel ILDC. Similarly, as ILDC is ramping up, the low frequency component of ILAC is ramping down to cancel ILDC. In particular, ILAC is AC coupled through CAC capacitor 528 and combined with the ILAC current. The combined current ripple of the switching regulator stages (ILDC+ILAC) is shown at 630. As illustrated, in this example, modulating the high frequency stage 524 output current at approximately the frequency of the low frequency stage 526, but with an opposite polarity, results in cancellation of the low frequency current waveforms and reduction of the ripple current. Reduction of the ripple current, in turn, reduces the ripple voltage on VOUT. In one embodiment described in more detail below, the switching frequency of AC stage 524 may advantageously be an integer multiple of the switching frequency of the DC stage 526 to align the switching cycles of multiple stages and further improve ripple cancellation.

Figure 7:
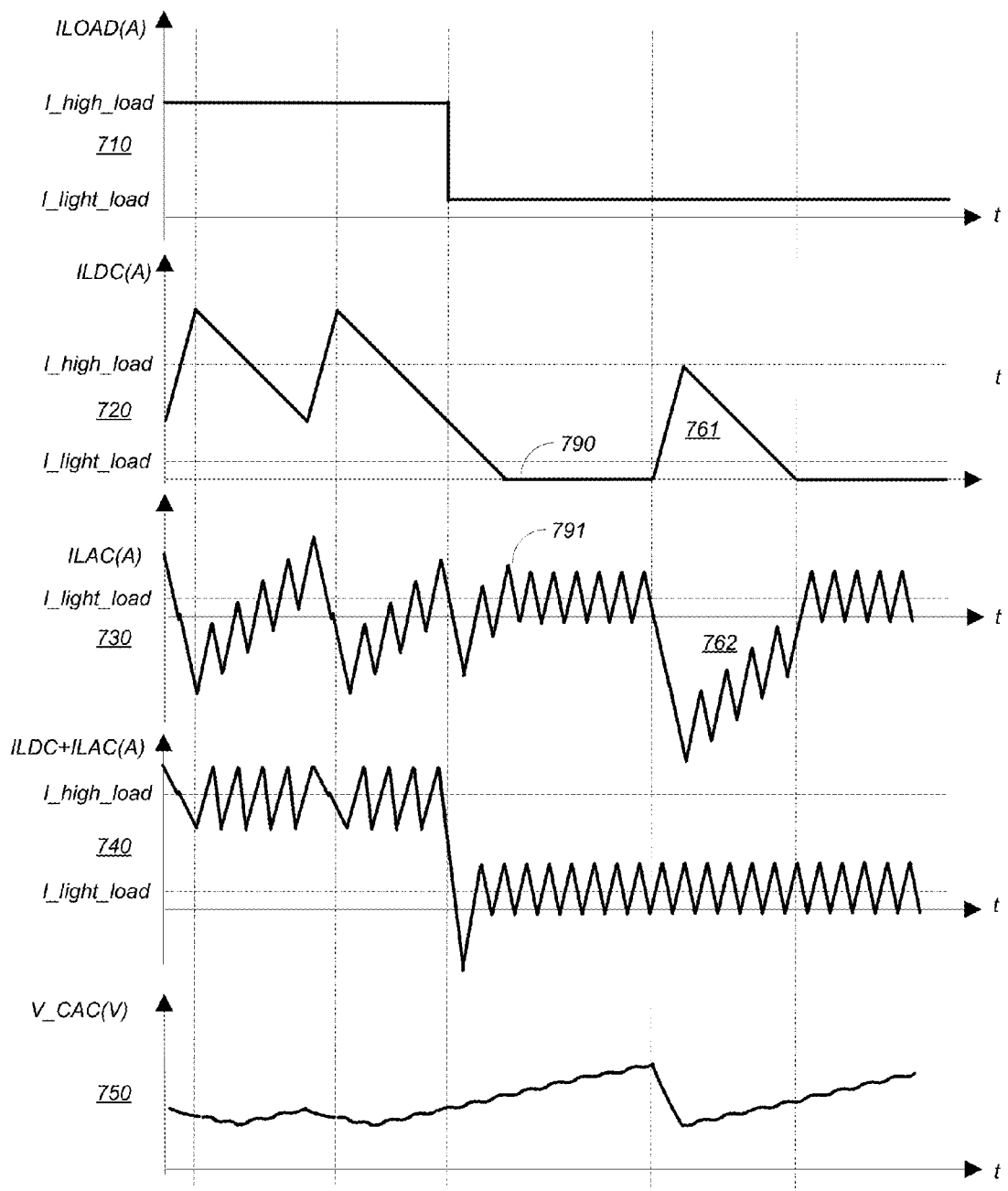
FIG. 7 illustrates a current step for an example voltage regulator using the switching regulator topology shown in FIG. 5.

FIG. 7 illustrates a current step for an example voltage regulator using the switching regulator topology shown in FIG. 5. In this example, a voltage regulator transitions from a heavy load (high load) to a light load as shown at 710. While the load is high, the DC stage supports the DC current as shown at 720 and the AC stage cancels the current ripple of the DC stage as shown at 730 and 740. In some example applications, embodiments of the present disclosure may turn off one stage when a load current is below a threshold. For example, when the load is light (less than some threshold) the DC stage may be disabled as shown in plot 720 at 790, and the AC may support the light load current as shown in plot 730 at 791. However, when the DC stage is disabled, the AC stage provides current to the load through the CAC capacitor. This has the effect of charging the voltage across the CAC capacitor away from a nominal value as illustrated at 750. From time to time the DC stage may be enabled to allow the AC stage to discharge the CAC capacitor without disturbing the output voltage as shown at 761 and 762. During this discharge, the DC stage sources current into the bottom plate of the CAC capacitor while the AC stage sinks current from the top plate of the CAC capacitor. Because the source and sink currents cancel each other, the output voltage is not disturbed by this recharge action.

Referring again to FIG. 5, inductors 520 and 522 may be coupled inductors to further reduce ripple. Coupled inductors may comprise conductors arranged in loops around overlapping regions so that the elements are inductively coupled such that the magnetic fields of each inductor interact, for example. Transformers are one form of coupled inductors. Some coupled inductors may have multiple windings around a core (e.g., a magnetic core, such as ferrite) and other coupled inductors may have not core (e.g., air core inductors), for example. When a two-phase buck regulator is using coupled inductors, the ripple current in the inductors windings and in the switches tends to a minimum as the duty cycle of the buck regulator tends to 50%. When the duty cycle is at 50% the voltage drop across one inductor may be the opposite than the voltage drop across the other inductor resulting in a maximum current ripple reduction. Coupled inductors may further reduce ripple in the inductors and switches for duty cycles (Vout/Vin) different than 50% when implemented using the architecture shown in FIG. 5, for example. As one example embodiment, if both the DC stage and AC stage have the same switching frequency by actively regulating the VAC node at VIN-VOUT and applying the proper phasing between the DC and AC stages, the IL_AC and IL_DC currents can slew at the exact opposite rates (e.g., when the regulator is in steady state). Because of that and the fact that the two inductors are coupled, a maximum current ripple reduction is observed regardless of the VIN(s) and VOUT voltage in the inductors and the switches. If the AC stage is operated at a higher switching frequency than the DC stage, a low frequency modulation (matching the switching frequency of the DC stage) can be introduced in the AC stage current such that at the switching frequency of the DC stage, IL_DC and IL_AC slew at the exact opposite rate at all time. Because of that and the fact that the two inductors are coupled, a maximum current ripple reduction is observed regardless of the VIN(s) and VOUT voltage in the inductors and the switches.

For comparison purposes, substantially the same ripple may be obtained in two cases where one implementation uses larger components and no inductive coupling and another implementation uses inductive coupling and smaller components as follows:

No inductive coupling: LAC=20 nH, LDC=20 nH
With inductive coupling: LAC=12 nH, LDC-12 nH Additionally, when the inductors are coupled through the air, a large current offset can exists between the IL_DC and IL_AC currents. This is not the case when for example a core ferrite material is used to couple the inductors: this core can saturate if the difference between IL_DC and IL_AC currents becomes too large. So when the inductors are coupled through the air, the AC stage can be designed to switch at a high switching frequency and carry no DC current while the DC stage can be designed to switch at a low switching frequency and carry the all, or nearly all, DC load current. This presents stability, loop bandwidth and filter component size reduction advantages explained herein.

Figure 8:
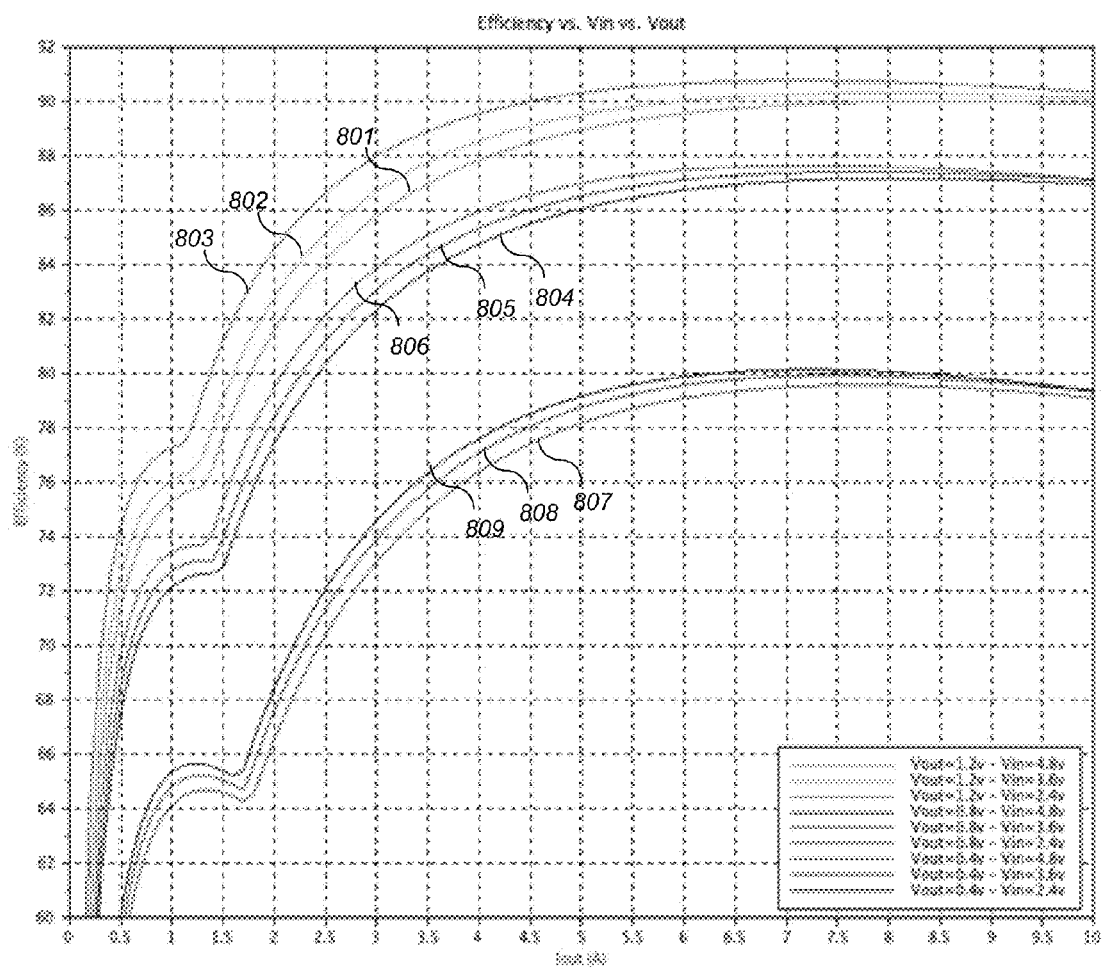
FIG. 8 shows improved efficiency of a voltage regulator according to one embodiment.

FIG. 8 shows improved efficiency of a voltage regulator according to one embodiment. For a particular optimization of 4 different power switches, the light load efficiency of the voltage regulator of FIGS. 2 and 5 can be increased by turning off the DC stage when the load current drops below a certain threshold. The point where the DC stage is turned off is shown by discontinuities in the curves, for example. Curves 801-809 correspond to the following values of Vin and Vout:

|      | 801 | 802 | 803 | 804 | 805 | 806 | 807 | 808 | 809 |
|------|-----|-----|-----|-----|-----|-----|-----|-----|-----|
| Vin  | 4.8 | 3.6 | 2.4 | 4.8 | 3.6 | 2.4 | 4.8 | 3.6 | 2.4 |
| Vout | 1.2 | 1.2 | 1.2 | 0.8 | 0.8 | 0.8 | 0.4 | 0.4 | 0.4 |

Example Using Summed Sawtooth Waveforms

Figure 9:
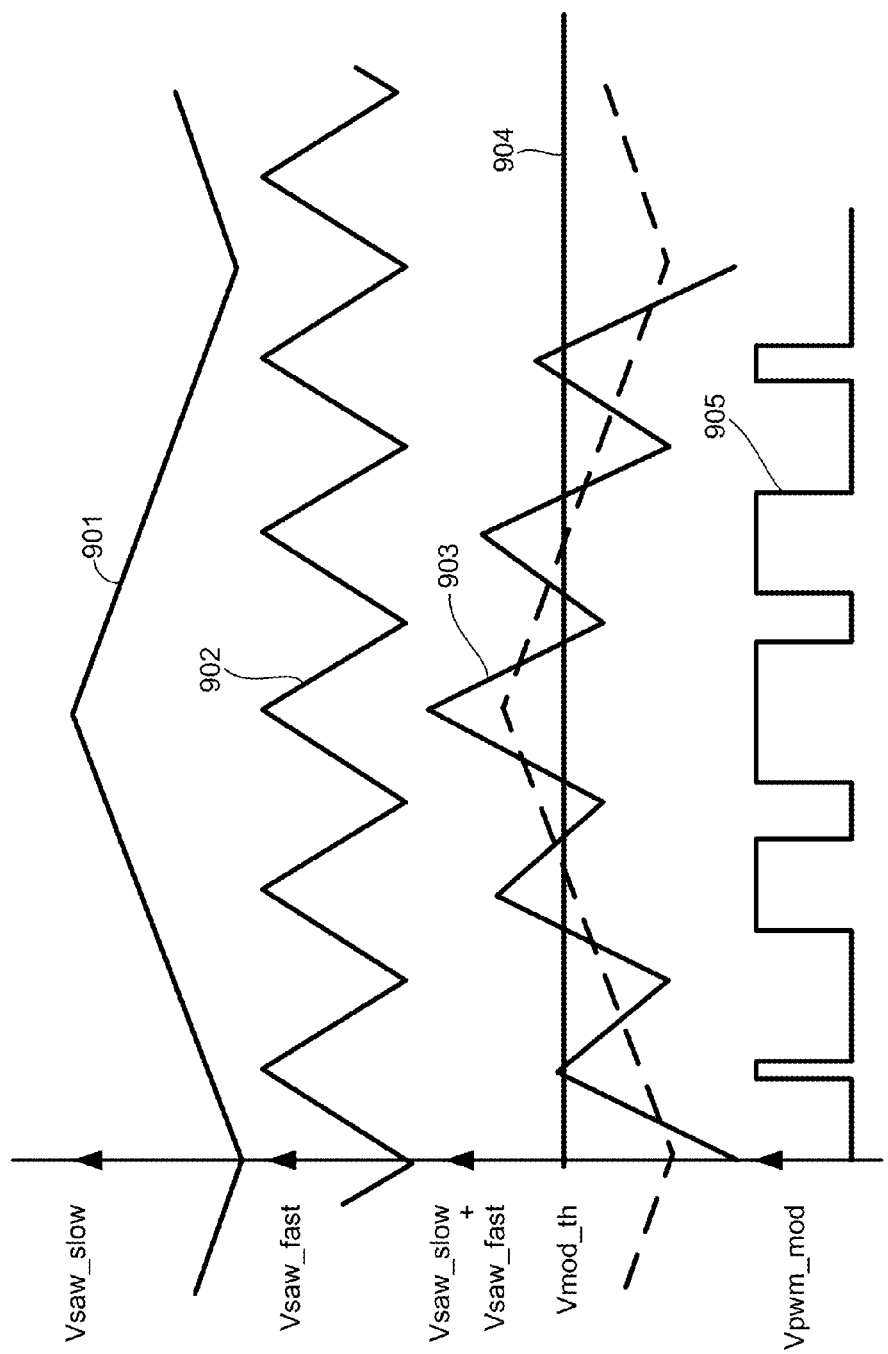
FIG. 9 illustrates summing triangle waves to cancel ripple according to one embodiment.

In one example implementation, summed sawtooth waves are used to produce a modulated sawtooth wave in one stage to cancel ripple in another stage. Features and advantages of some example embodiments may include operating an AC stage of a switching regulator to at least partially cancel ripple in a DC stage of the switching regulator. In the following description, triangle waveforms are used for illustrative purposes, but in other embodiments other sawtooth waveforms (e.g., ramps) and equivalents may be used. As mentioned above, an AC stage of a switching regulator may use a modulated triangle wave to cancel ripple in the DC stage of the switching regulator. One example technique that may be used is shown in FIG. 9. FIG. 9 illustrates summing triangle waves to cancel ripple according to one embodiment. In this example, a low frequency triangle wave (e.g., Vsaw_slow) 901, which may be used in a DC stage of the switching regulator, is combined with a higher frequency triangle wave (e.g., Vsaw_fast) 902. The sum of low frequency triangle wave 901 and high frequency triangle wave 902 is a modulated triangle wave 903 (Vsaw_slow+Vsaw_fast). Modulated triangle wave 903 may be compared to a reference, such as modulation threshold (Vmod_th) 904 to produce a pulse width modulated (PWM) signal (e.g., Vpwm_mod) 905 for driving an AC stage of a switching regulator, for example.

Figure 10:
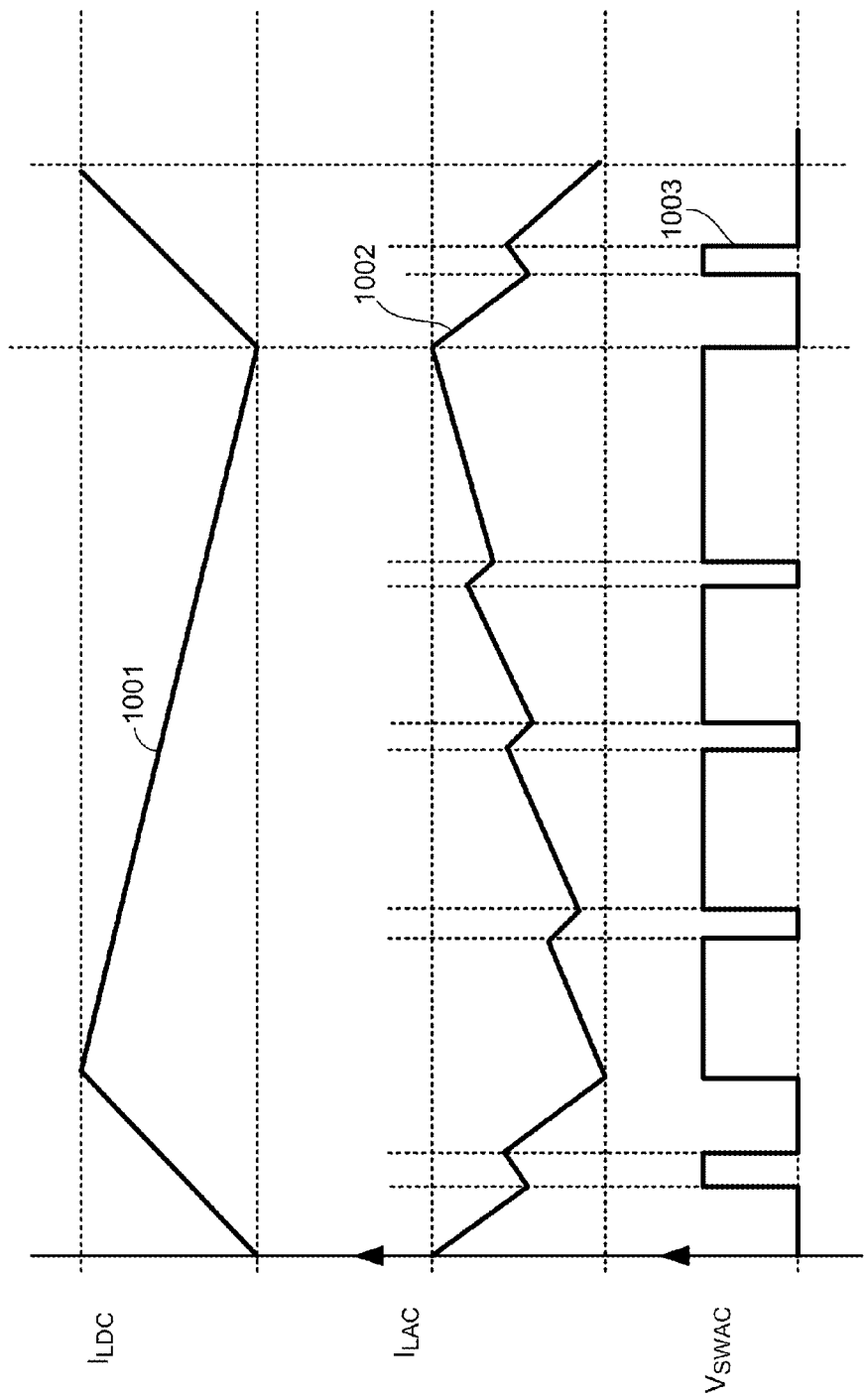
FIG. 10 illustrates switching regulator output currents produced from summed triangle waves according to one embodiment.

FIG. 10 illustrates switching regulator output currents produced from summed triangle waves according to one embodiment. As illustrated in FIG. 10, a DC stage may produce an output inductor current ILDC having a ripple shown by current waveform 1001, for example. In this example, an AC stage may be driven with PWM signal 905 to produce an output inductor current ILAC having a ripple shown by current waveform 1002, for example. Waveform 1003 shows an example voltage on a switching node of an AC stage (VSWAC) to produce ILAC.

Figure 11:
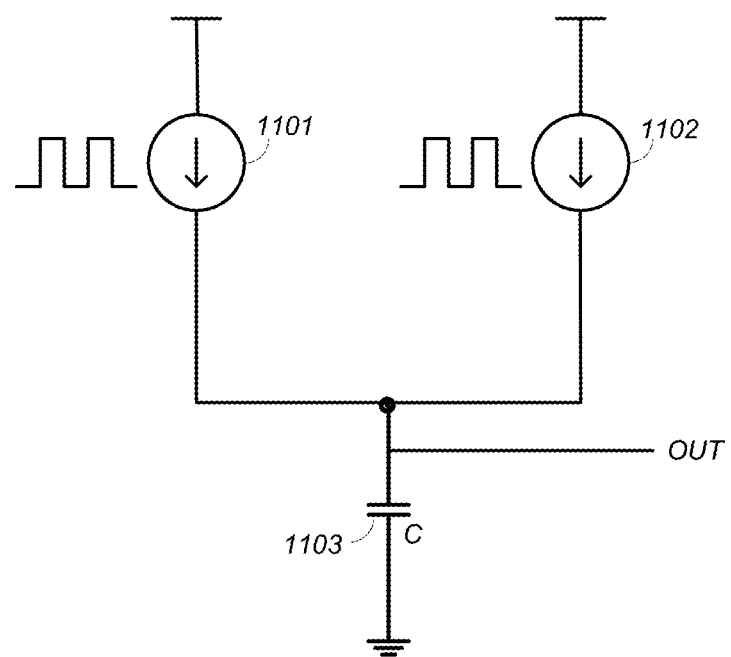
FIG. 11 illustrates an example circuit for producing summed triangle waves according to one embodiment.

FIG. 11 illustrates an example circuit for producing summed triangle waves according to one embodiment. In this example, a first current source 1101 is switched at a first frequency, which may be the operating frequency of a DC stage of a switching regulator (e.g., 5 MHz), for example. A positive current into a capacitor 1103 may produce a positive ramp and a negative current may cause a negative ramp, for example. A second current source 1102 may be switched at a second higher frequency (e.g., 30 MHz), such as the operating frequency of an AC stage of the switching regulator, for example. The output terminal of the capacitor, OUT, has a voltage having a modulated triangle waveform as shown at 903 in FIG. 9, for example.

Figure 12:
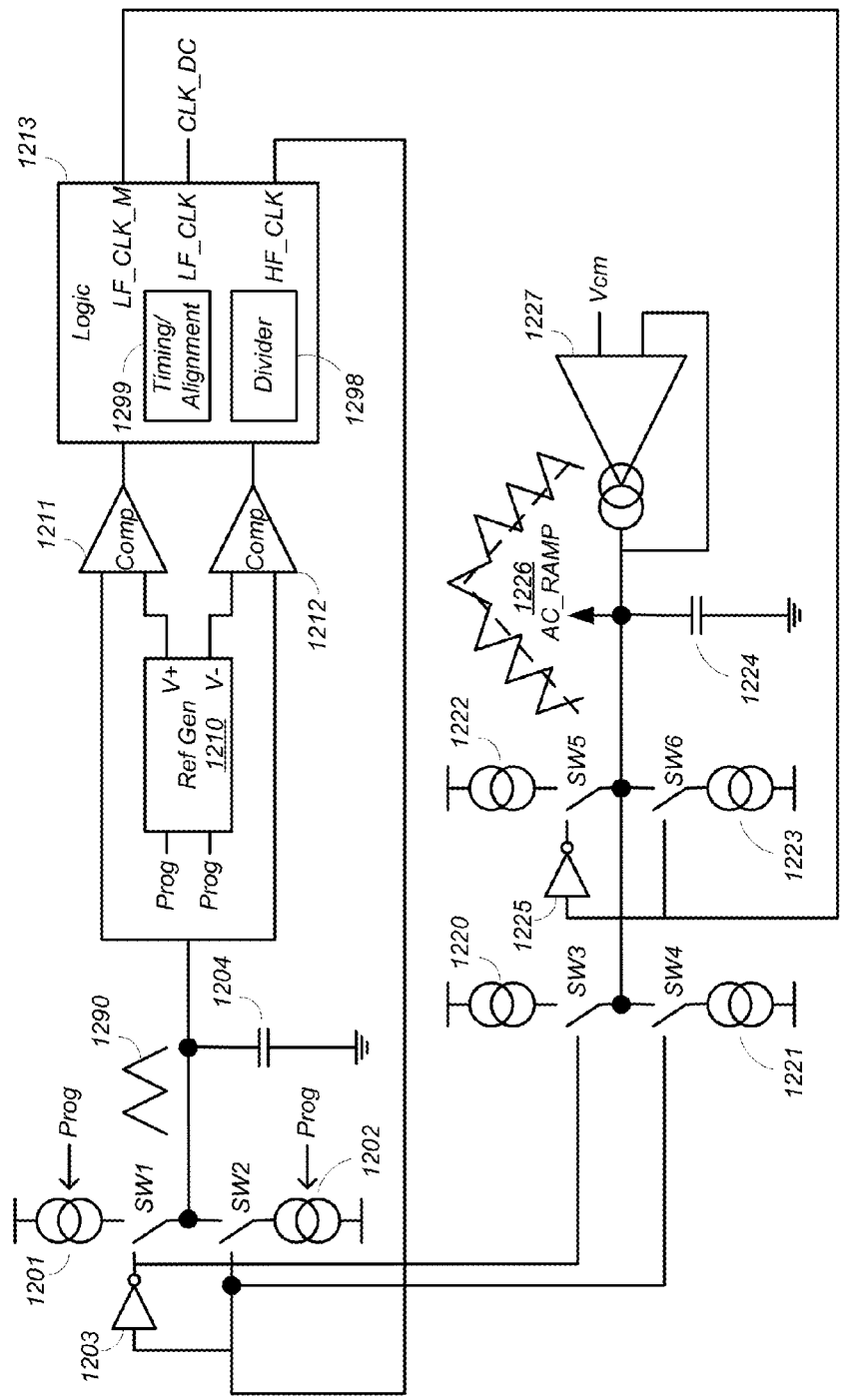
FIG. 12 illustrates an example circuit for generating a modulated triangle wave according to one embodiment.

FIG. 12 illustrates an example circuit for generating a modulated triangle wave according to one embodiment. Programmable current sources 1201 and 1202 may alternatively drive a voltage on a capacitor 1204 high and low. A constant current from current source 1201 into capacitor 1204 creates a voltage ramp up, and a constant current into current source 1202 creates a voltage ramp down. The resulting triangle wave 1290 is coupled to inputs of comparators 1211 and 1212. Programmable reference generator 1210 may produce reference voltages V+ and V−. When triangle waveform 1290 increases to V+ a first comparator output is triggered by comparator 1211, and when triangle waveform 1290 decreases to V− a second comparator output is triggered by comparator 1212. Programmable current sources 1201 and 1202 and programmable voltage reference 1210 may be used by logic 1213 to produce a high frequency clock (HF_CLK), which in turn drives the switches SW1 and SW2 to lock in on a particular HF_CLK frequency, for example. In one example embodiment, HF_CLK may be a 30 MHz clock.

Logic 1213 may further produce a low frequency clock (LF_CLK), which may be used to generate a modulated triangle waveform, for example. In one embodiment, LF_CLK may be a divided version of HF_CLK. In one embodiment, logic 1213 includes a divider 1298 to receive HF_CLK and produce LF_CLK. In one embodiment, LF_CLK is produced by dividing HF_CLK by an integer, such that the frequency of HF_CLK is an integer multiple of LF_CLK, for example. LF_CLK may be used as a clock for a DC stage (CLK_DC) as illustrated in an example below. Logic 1213 may further include timing and alignment circuitry 1299 for adjusting the phase and timing of the LF_CLK signal to control the alignment of LF_CLK and produce a modified LF_CLK signal, LF_CLK_M.

HF_CLK and LF_CLK_M may be received by a modulated sawtooth generator circuit. A high frequency sawtooth waveform is produce by current sources 1220 and 1221 alternately sourcing and sinking current into capacitor 1224 under the control of switches SW3 and SW4 that are driven with HF_CLK. The high frequency sawtooth waveform is modulated by a low frequency sawtooth waveform produced by current sources 1222 and 1223 alternately sourcing and sinking current into capacitor 1224 under the control of switches SW5 and SW6 that are driven with the modified low frequency clock, LF_CLK_M. Timing circuits in logic 1213 allow LF_CLK_M to be adjusted to align with HF_CLK so that peaks and valleys of each sawtooth waveform occur approximately at the same time to improve efficiency of the system. Transconductance amplifier 1227 senses the voltage on capacitor 1224 and maintains the voltage at a particular common mode value.

Example Circuit Implementations

Figure 13:
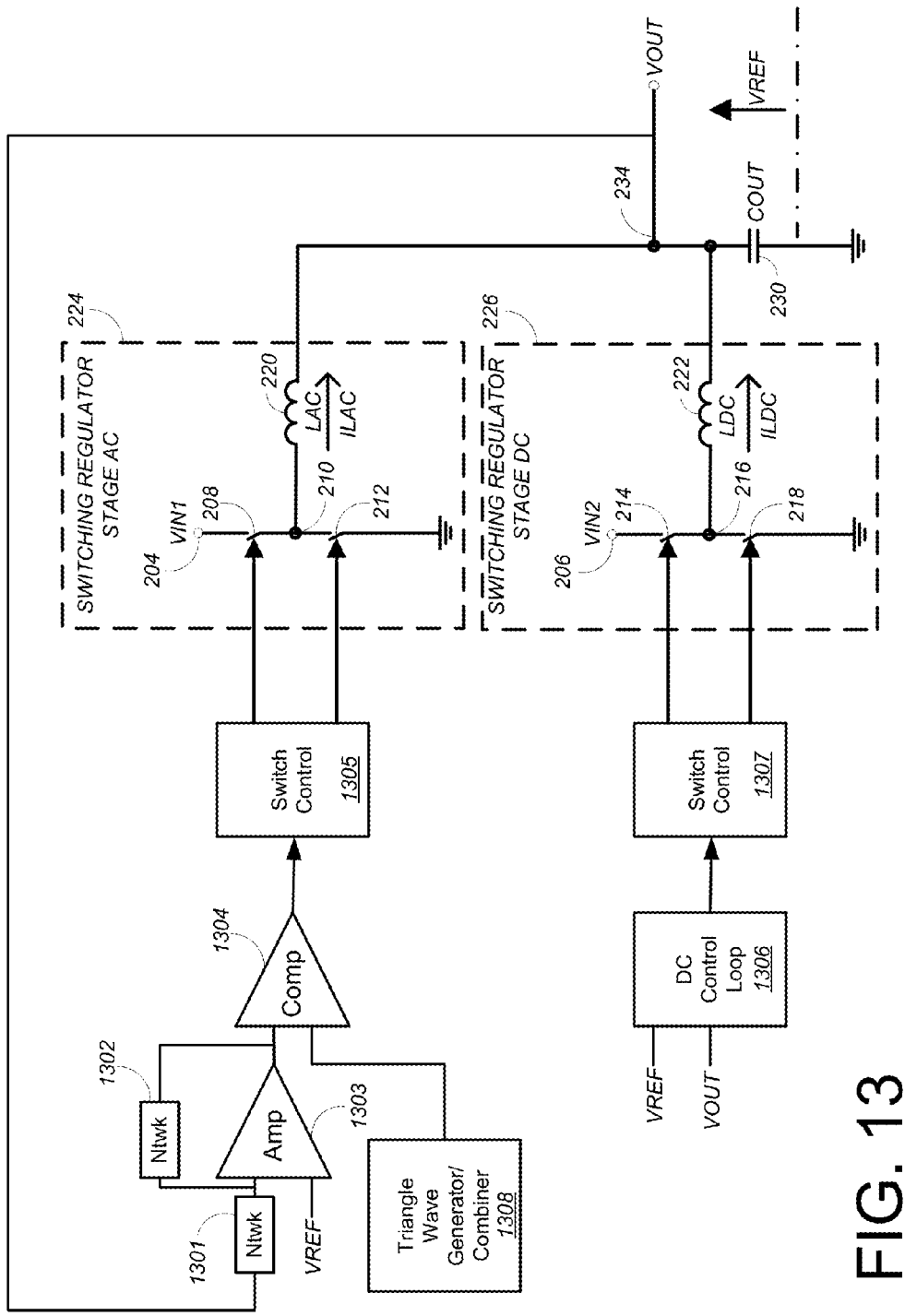
FIG. 13 illustrates a circuit including summed triangle waves according to one embodiment.

FIG. 13 illustrates a circuit according to one embodiment. In this example, switching stage 224 and switching stage 226 from FIG. 2 operate as describe above for FIG. 2 and have the same output voltage and duty cycle. DC stage 226 is controlled by DC control loop circuitry 1306 coupled to receive switching regulator output voltage VOUT and a reference voltage VREF, for example. DC loop control circuit 1306 may produce a low frequency PWM signal to switch control circuit 1307, which may include driver circuits for turning switches 214 and 218 on and off to produce a current ILDC in DC inductor (LDC) 222. Control circuitry for the AC stage may include a compensation network 1301 and 1302 and amplifier 1303 having an input coupled to a switching regulator output voltage, VOUT, for example. Amplifier 1303 also has an input coupled to a reference voltage, VREF, and may produce an error signal. An input of a comparator 1304 is coupled to receive the error signal from amplifier 1303. Another input of comparator 1304 is coupled to receive a modulated triangle wave produced by triangle wave generator and combiner circuit 1308, for example. The AC stage may use summed triangle waves from circuit 1308 that have a high frequency component and a low frequency component equal to the frequency of the DC stage to control switches 208 and 212, for example. Comparator 1304 may produce a PWM signal similar to PWM signal 905, for example. A PWM signal from comparator 1304 may be coupled to switch control circuit 1305, which may include driver circuits for turning switches 208 and 212 on and off and produce a VSWAC signal at switching node 210 and current ILAC in inductor LAC 220 of the AC stage 224, for example, to cancel ripple in the DC stage 226.

Figure 14:
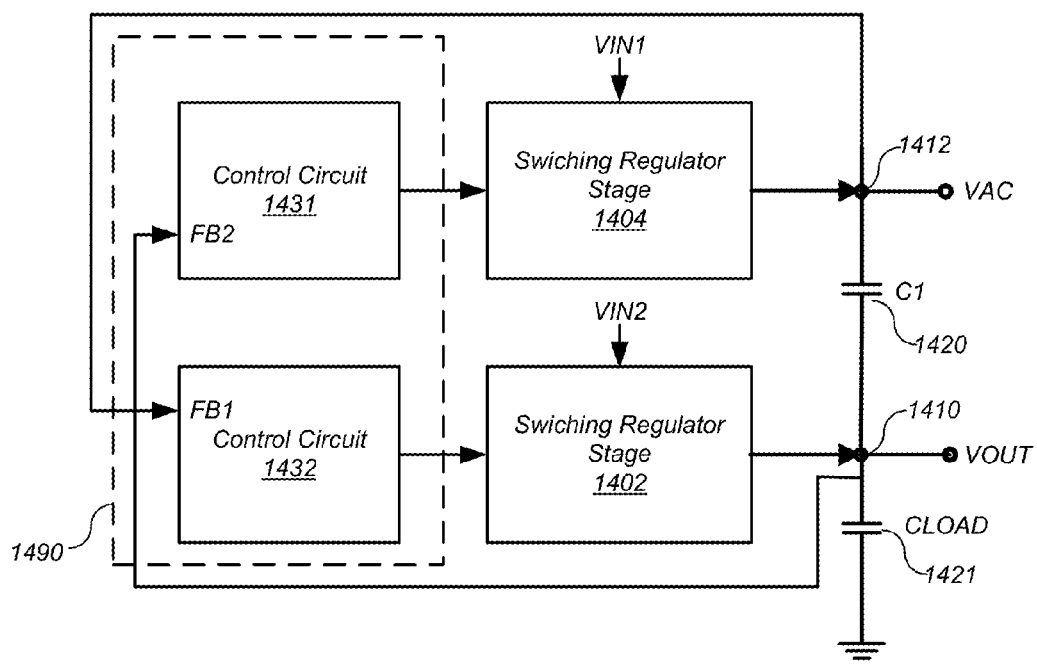
FIG. 14 illustrates another example switching regulator configuration according to one embodiment.

FIG. 14 illustrates another example switching regulator configuration according to one embodiment. In this example, control circuit 1490 includes a control circuit 1431 having an input coupled to node 1410 and an output coupled to switching regulator stage 1404 to modify the operation of switching regulator stage 1404. Further, control circuit 1490 includes a control circuit 1432 having an input coupled to node 1412 and an output coupled to switching regulator stage 1402 to modify the operation of switching regulator stage 1402. In one embodiment, control circuit 1431 has a first bandwidth for responding to a transient on node 1410 and control circuit 1432 has a second bandwidth for resetting a voltage on node 1412, for example, and the first bandwidth is greater than the second bandwidth. Stage 1404 may further operate at a higher switching frequency than stage 1402. In one embodiment, control circuit 1432 may produce a current in node 1410 to offset a corresponding current in node 1410 from switching regulator stage 1404 to reset voltage VAC on node 1412. As illustrated in FIG. 14, the feedback inputs from VOUT and VAC are cross coupled such that stage 1402 responds to changes in VAC and stage 1404 responds to changes in VOUT. Further examples and disclosure regarding cross coupled stages in FIG. 14 are disclosed in commonly-owned concurrently filed U.S. patent application Ser. No. 14/315,691, entitled "Circuits and Methods for Providing Current to a Load," naming David Christian Gerard Tournatory as inventor, the content of which is hereby incorporated herein by reference in its entirety.

Figure 15:
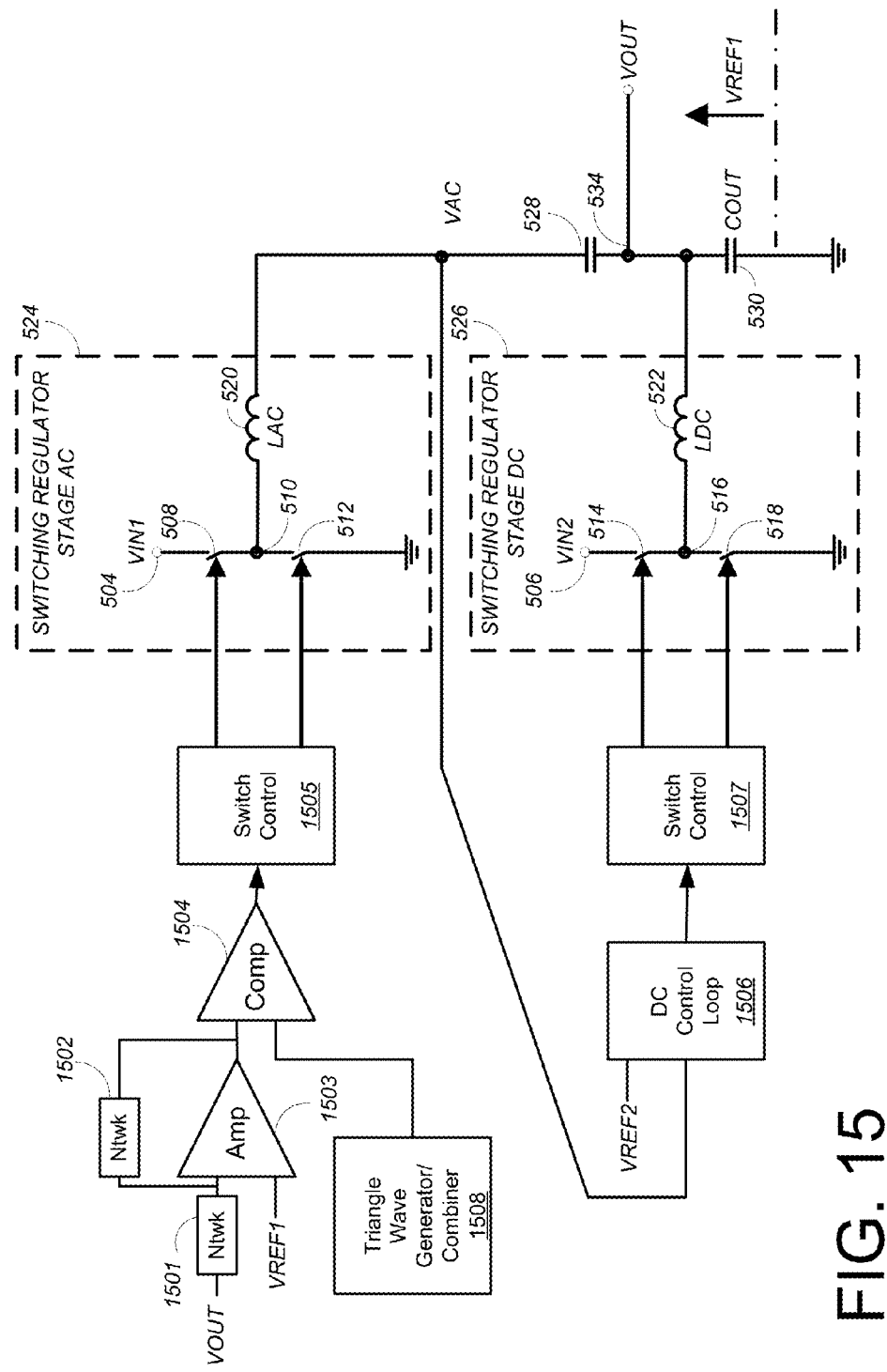
FIG. 15 illustrates an example circuit according to another embodiment.

FIG. 15 illustrates an example circuit according to another embodiment. In this example, AC stage 524 and DC stage 526 operate as described above for FIG. 5 and may have different output voltages and different duty cycles due to capacitor 528, for example. In this example, AC stage control circuitry is coupled to receive the DC stage output voltage VOUT to produce an inductor current ILAC. DC stage control circuitry is coupled to receive the AC stage output voltage VAC to produce an inductor current ILDC. Stage 524 operates at a higher switching frequency than stage 526.

DC stage 526 is controlled by DC control loop circuitry 1506 coupled to receive stage 524 output voltage VAC and a reference voltage VREF2, for example. DC loop control circuit 1506 may produce a low frequency PWM signal to switch control circuit 1507, which may include driver circuits for turning switches 514 and 518 on and off to produce a current ILDC in DC inductor (LDC) 522. Control circuitry for the AC stage may include a compensation network 1501 and 1502 and amplifier 1503 having an input coupled to a switching regulator output voltage, VOUT, for example. Amplifier 1503 also has an input coupled to a reference voltage, VREF1, and may produce an error signal. An input of a comparator 1504 is coupled to receive the error signal from amplifier 1503. Another input of comparator 1504 is coupled to receive a modulated triangle wave produced by triangle wave generator and combiner circuit 1508, for example. The AC stage may use summed triangle waves from circuit 1508 that have a high frequency component and a low frequency component equal to the frequency of the DC stage to control switches 508 and 512, for example. Comparator 1504 may produce a PWM signal similar to PWM signal 905, for example. A PWM signal from comparator 1504 may be coupled to switching control 1505, which may include driver circuits for turning switches 508 and 512 on and off and produce a VSWAC signal at switching node 510 and current ILAC in inductor LAC 520 of the AC stage 524, for example, to cancel ripple in the DC stage 526.

Figure 16:
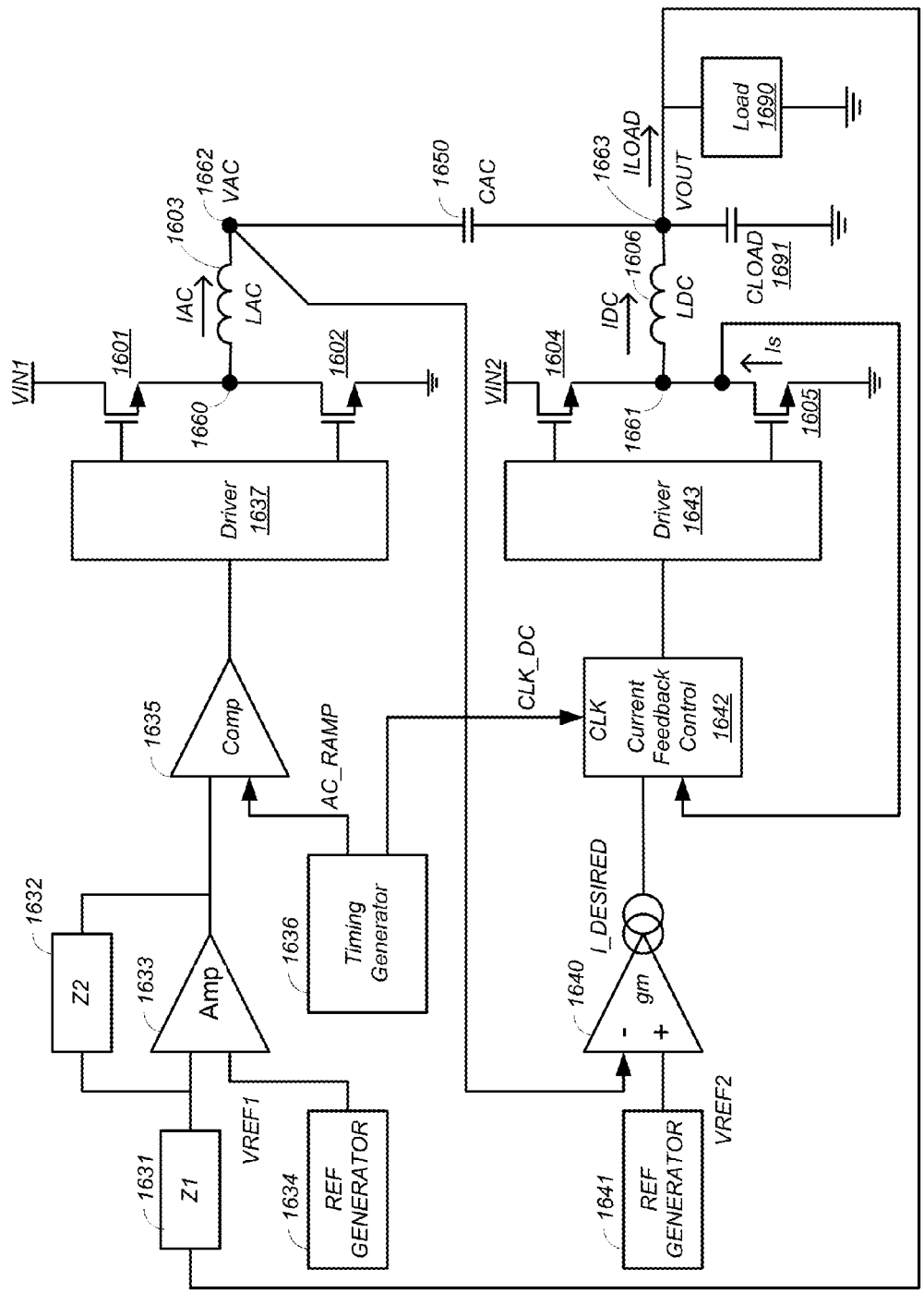
FIG. 16 illustrates another example of a switching regulator circuit according to one embodiment.

FIG. 16 illustrates another example of a switching regulator circuit according to one embodiment. A first regulator stage (the AC stage) includes switching transistors 1601-1602, inductor 1603, and associated control and driver circuits 1631-1637. MOS transistor 1601 (acting as a high side switch) has a drain coupled to a first power supply voltage VIN1, a source coupled to a switching node 1660, and a gate coupled to driver circuit 1637 to receive signals to turn transistor 1601 ON and OFF. Similarly, MOS transistor 1602 (acting as a low side switch) has a drain coupled to the switching node 1660, a source coupled to a reference voltage (e.g., ground), and a gate coupled to driver circuit 1637 to receive signals to turn transistor 1602 ON and OFF. A first terminal of inductor 1603 LAC is coupled to the switching node 1660 and a second terminal is coupled to an output node 1662 of the switching regulator stage having a voltage VAC.

A second regulator stage (the DC stage) includes switching transistors 1604-1605, inductor 1606, and associated control and driver circuits 1640-1643. MOS transistor 1604 (acting as a high side switch) has a drain coupled to a second power supply voltage VIN2, a source coupled to a switching node 1661, and a gate coupled to driver circuit 1643 to receive signals to turn transistor 1604 ON and OFF. Similarly, MOS transistor 1605 (acting as a low side switch) has a drain coupled to the switching node 1661, a source coupled to a reference voltage (e.g., ground), and a gate coupled to driver circuit 1643 to receive signals to turn transistor 1605 ON and OFF. A first terminal of inductor 1606 LDC is coupled to the switching node 1661 and a second terminal is coupled to an output node 1663 of the switching regulator stage having a voltage VOUT.

In this example, the output voltage VOUT on output node 1663 is coupled to the input of control circuits associated with the AC stage. In this example, AC stage control circuits include a first impedance circuit 1631 having an input coupled to VOUT and an output coupled to a terminal of amplifier 1633. A second impedance circuit 1632 has an input coupled to an output of amplifier 1633 and an output coupled to the input of amplifier 1633. A second input of amplifier 1633 receives a reference voltage (e.g., VREF1) from reference generator 1634. In one embodiment, reference generator 1634 may be programmable to change VREF1 on command, for example, and thereby change VOUT. An output of amplifier 1633 is coupled to one input of comparator 1635. A second input of comparator 1635 is coupled to a timing generator 1636 to receive a modulated sawtooth, AC_RAMP, having high and low frequency components. Timing generator 1636 may be implemented as illustrated in FIG. 12, for example. The output of comparator 1635 is a PWM signal. The PWM signal is coupled to driver 1637 to control the switches 1601 and 1602. By operation of the loop, switches 1601 and 1602 will adjust VOUT to be equal to VREF1.

The output voltage VAC at node 1662 is coupled to the input of control circuits associated with the DC stage. DC stage control circuits include a transconductance amplifier ("gm") 1640 that receives VAC and a reference voltage VREF2 from reference generator 1641. Amplifier 1640 compares VAC to VREF2 and outputs a current I_DESIRED, which corresponds to a desired current at the DC stage output to result in VAC being equal to VREF2. I_DESIRED is provided to a current feedback circuit 1642 together with a sensed output current, Is, and a DC stage clock, CLK_DC from timing generator 1636. CLK_DC may be a integer fraction (1/M) of the high frequency component of the AC_RAMP signal so that the switching frequency of driver 1637 and transistors 1601 and 1602 in the AC stage is an integer multiple of the switching frequency of driver 1643 and transistors 1604 and 1605 in the DC stage to cancel ripple at the output node 1663. Sensed output current, Is, may be sensed when transistor 1605 is turned ON, for example, and when the inductor current IDC is equal to the current through transistor 1605. Output current, Is, may be detected as a voltage drop across transistor 1605 and used to control driver circuit 1643 and switches 1604 and 1605. Output current sensing and an example feedback control circuit are disclosed in commonly owned concurrently filed U.S. patent application Ser. No. 14/315,672, entitled "Switching Regulator Current Mode Feedback Circuits and Methods," naming David Christian Gerard Tournatory as inventor, the content of which is hereby incorporated herein by reference in its entirety. Driver circuit 1637 may embody techniques disclosed in commonly owned concurrently filed U.S. patent application Ser. No. 14/315,768, entitled "Circuits and Methods for Operating a Switching Regulator," naming David Christian Gerard Tournatory and Nicolas Stephane Monier as inventors, the content of which is hereby incorporated herein by reference in its entirety. Further details about the load step response of the AC stage and DC stage are disclosed in previously mentioned U.S. patent application Ser. No. 14/315,691.

Advantages of Example Embodiments

This present disclosure combines two switching regulator stages referred to as the AC stage and DC stage to form a voltage regulator. The AC stage may be designed with a switching frequency higher than the DC stage and an inductance size lower than the DC stage. The AC stage and DC stage may be optimized such that the AC stage power switches are smaller than the DC stage power switches.

FIG. 16 illustrates an example implementation. At mid and high load the DC stage allows the voltage regulator to feature a high efficiency—because of the DC stage's larger power switches and low switching frequency—while the AC stage may be used to maintain the loop stability and cancellation of the current ripple of the DC stage.

At light load the DC stage is disabled (topology used in FIG. 1) or disables periodically (topology uses in FIG. 2). While the DC stage is disabled the AC stage may support all the function of the voltage regulator. Because the AC stage power switches are sized small (relative to the DC stage) the voltage regulator efficiency can be maintained relatively high at light load.

The output current ripple is maintained low regardless of the load current: At light load only the AC stage is active and because the AC stage switching frequency is high, its current ripple is low. At mid and high load the output current ripple is maintain low through the ripple cancellation of the DC stage ripple current by the AC stage.

The output current ripple is maintained low across the entire load current range, and therefore, this voltage regulator can operate with a small output capacitance. The AC stage switches at a high frequency. Therefore, its inductance can be sized small. The DC stage current ripple is cancelled by the AC stage. Therefore, the DC stage inductance can be sized small. As the result, all the external inductance and capacitance used in this example voltage regulator can be sized small, which makes its footprint small.

a. Active Cancellation of the DC Stage Current Ripple by the AC Stage.

The inductance current of the AC stage can be commanded such that it cancels most of the ripple current of the DC stage ripple current. When this is done the output bypass capacitance current ripple can be set almost as small as what it would be if the DC stage were disabled without impacting the output voltage ripple. Because of this active current ripple cancellation both the size of the output capacitance and the inductance of the DC stage can be reduced significantly.

b. Bandwidth and Stability of the Loop do not Depend on the Frequency and Output Inductance of the DC Stage.

This architecture allows setting the DC stage inductance size and switching frequency independently and without impacting the bandwidth and stability of the voltage regulator. In one example implementation, the bandwidth and the stability of the voltage regulator may depend exclusively on the output capacitance, the switching frequency, the amplifier and compensation network, and inductance size of the AC stage.

c. High Efficiency Across the Entire Load Range

Example embodiments disclosed herein allows optimizing the switching frequency, FET size and inductance size of the DC stage to maximize the efficiency under mid and heavy load condition. The two switching regulators stages are commanded such that the DC stage supports all the mid and heavy load DC current. While under those load condition the fast switching regulator only support transient current and maintains loop stability. Because the fast switching regulator AC stage does not support any mid and heavy DC load current, its power switches can be sized very small. This makes its light load efficiency much higher than the slow switching regulator DC that needs to be designed with relatively large power switches to obtain high efficiency under mid and heavy loads conditions.

At light load, in the case of the topology showed in FIG. 2, the DC stage is disabled to increase the voltage regulator efficiency.

At light load, in the case of the topology shown in FIG. 5, the stages DC can be disabled periodically for some prolonged period of time to increase the efficiency of the voltage regulator. From time to time as show on FIG. 7 the DC stage needs to be enabled for a brief period of time to discharge the coupling capacitance and avoid the output of the AC stage to be saturated at the input voltage.

d. Allows Symmetrical Current Slew of the AC Stage when the Two Switching Regulators Stages are Coupled Through a Capacitance (FIG. 5 Topology).

Coupling the two switching regulator stages through a capacitance as shown in FIG. 5 presents some important advantage for large signal response. It makes possible to regulate the output of the AC stage at any voltage deemed optimal such as VIN/2 and force it to operate with any average duty cycle deemed optimal such as 50%. 50% duty cycle on the AC stage makes its positive and negative inductance current slew-rates equal. Therefore the initial response of the voltage regulator to a given loading or unloading current step can be made symmetrical no matter what the output voltage is.

e. Option to Eliminate the Extra Losses Related of the Charge and the Discharge of the Coupling Capacitance by Shorting it or Omitting it.

Using the topology of FIG. 5 instead of the one presented in FIG. 2 (or not shorting the coupling capacitance shown in FIG. 5) presents some advantage as discussed in section d above for the load and voltage step responses. However the charge and discharge of the coupling capacitance creates an extra power loss for the system. Using the topology of FIG. 2 (or shorting the coupling capacitance in the topology presented in FIG. 5) eliminates that extra power loss. This may be done at light loads as described above.

f. Allow Significant Solution Foot Print Reduction without Major Efficiency Degradation.

As explained previously, because of the steady stage current ripple cancellation of the DC stage, the output capacitance can be sized small. The inductance of the DC stage can also be sized small because of the active ripple cancellation described earlier. Finally, the inductance of the AC stage can also be sized small because the switching frequency of the AC stage is high.

Because every external component can be sized small some embodiments of this solution may features a very small footprint. The absolute size of the solution footprint may be a function of the AC stage switching frequency. However the mid and heavy load condition efficiency depends mostly on how slow the DC stage switching frequency is. So the size of the solution and the efficiency is somewhat de-correlated, which confers this solution a better efficiency/foot print size ratio than conventional buck topology.

Integration in Package

One advantageous application of certain embodiments of the present disclosure is integration of a regulator into a package. Traditionally, integrated circuits sometimes require multiple power supply voltages to operate. In some cases, an integrated circuit (IC) package may therefore have multiple different power supply inputs at different voltages to connect external regulators with each of the different power supply terminals on the IC package. However, features and advantages of the present disclosure may facilitate integration of one or more regulators inside the package. Integration of a regulator inside a package according to certain embodiments described herein is also advantageous because an integrated voltage regulator may reduce the amount of current flowing through an IC package connection (e.g., such as a solder ball). Integration of a switching regulator inside a package may allow higher voltages, at lower corresponding currents for a particular power level, to be brought inside the IC package. Internal switching regulators in the package may translate the higher voltages down to lower voltages and higher currents to provide lower voltage higher current power supplies to integrated circuits in the package. Multiple different voltages may be generated inside a package by multiple integrated switching regulators, for example, thereby reducing pin count on the package and reducing the current flow, and corresponding resistive losses, through package pins.

Package Integration Via Reduced Ripple

One challenge faced when integrating a switching regulator onto a package pertains to the size of external components used by the switching regulator (e.g., inductors and capacitors). For example, a buck switching converter operating at 5 MHz may require a very large inductor and capacitor to meet an output voltage ripple specification of +/−30 mV. To meet a stringent output voltage ripple specification, the inductance is typically increased to reduce the current slew rate and thereby reduce current ripple. Moreover, current ripple drives charge onto the switching regulator's output capacitor, causing a voltage ripple given by Vripple=Q/C. Thus, the output capacitance is also typically increased to reduce voltage ripple to meet power supply voltage specifications. These large inductances and capacitances render typical switching regulators impractical for integration onto a package. To reduce component sizes, the switching frequency of the switching regulator may be increased, but increases in the switching frequency reduce the efficiency of the switching regulator resulting from losses caused by the increased charge and discharge of internal capacitances and other factors.

For comparison purposes, one example implementation of a switching regulator according to the present disclosure, such as shown in FIGS. 5 and 6, may include the following component sizes: LDC=36 nH, LAC=23 nH, CAC/C1=4.7 uF, and COUT/CLOAD=4.7 uF, where Vout=0.6 v, VAC=5 v, Vin=10 v, Freq_DC=5 MHz, and Freq_AC=30 MHz.

Small component sizes are achieved without the typical loss in efficiency because the DC path is operating at lower frequency and very high efficiency, thereby providing a high efficiency switching regulator that may be integrated into a package.

An independent voltage on the AC stage allows setting the output voltage on the DC stage, VOUT, at any value. For example, the AC stage output voltage may be set at VAC=½VIN, where the slew rates become symmetrical, thereby allowing ripple cancellation at lower frequencies in the DC stage than if a typical non-symmetric 2 phase Buck switching regulator were used.

Based on the disclosure herein, embodiments may include an apparatus comprising a first switching regulator (e.g., a DC phase) coupled to an output node and a second switching regulator (e.g., an AC phase) coupled to the output node, wherein the first switching regulator operates at a different frequency than the second switching regulator, and wherein the first switching regulator may at least partially cancel a ripple on the output node produced by the first switching regulator.

In one embodiment, the second switching regulator is coupled to the output node through a capacitor, the capacitor having a first terminal coupled to the output node and a second terminal coupled to the second switching regulator.

In one embodiment, when a load current is high, one switching regulator supports a DC current and the other switching regulator cancels a current ripple of the second switching regulator, and when the load current is light a switching regulator is disabled and the other switching regulator supports the light load current.

In one embodiment, the present disclosure includes a method comprising operating a first switching regulator at a first frequency to drive an output node and operating a second switching regulator at a second frequency to drive the output node, wherein the first switching regulator cancels a ripple on the output node produced by the first switching regulator.

The DC stage may include associated signal processing and/or control circuitry for operating the DC stage, and the AC stage may include associated signal processing and/or control circuitry for operating the AC stage. In some example embodiments, control circuitry may provide signals to both the AC stage and the DC stage.

The above description illustrates various embodiments along with examples of how aspects of the embodiments may be implemented. The above examples and embodiments should not be deemed to be the only embodiments, and are presented to illustrate the flexibility and advantages of the various embodiments as defined by the following claims. Based on the above disclosure and the following claims, other arrangements, embodiments, implementations and equivalents will be evident to those skilled in the art and may be employed without departing from the spirit and scope of the embodiments as defined by the claims.

What is claimed is:

1. A circuit, comprising:
   a first switching regulator stage comprising a first plurality of switches and an inductor, wherein the first switching regulator stage generates a first ripple current having a first frequency component and a second frequency component, wherein the second frequency component is less than the first frequency component;
   a second switching regulator stage comprising a second plurality of switches and an inductor; and
   an output node coupled to an output of the first switching regulator stage and an output of the second switching regulator stage, wherein the first switching regulator stage operates at a different frequency than the second switching regulator stage.

2. The circuit of claim 1, wherein the first switching regulator stage is operated at a first frequency and the second switching regulator stage is operated at a second frequency less than the first frequency.

3. The circuit of claim 2, wherein the first frequency is an integer multiple of the second frequency.

4. The circuit of claim 1, wherein the first switching regulator stage at least partially cancels a voltage ripple on the output node produced by the second switching regulator stage.

5. The circuit of claim 1, wherein the second switching regulator stage generates a second ripple current having the second frequency component, wherein the first ripple current has an opposite polarity than the second ripple current at the second frequency component so that the first ripple current at least partially cancels at least a portion of the second ripple current.

6. The circuit of claim 1, wherein the output node is coupled to a load, wherein the second switching regulator stage is turned off when an output current to the load falls below a threshold.

7. The circuit of claim 6, wherein the second switching regulator is turned on periodically to reset a voltage on a capacitor coupled between the output of the first switching regulator stage and the output of the second switching regulator stage.

8. The circuit of claim 1, further comprising a modulated sawtooth wave generator circuit to combine a first sawtooth wave at a first frequency with a second sawtooth wave at a second frequency less than the first frequency to produce a modulated sawtooth wave, wherein the modulated sawtooth wave controls the first switching regulator stage and wherein the second regulator stage operates at the second frequency.

9. The circuit of claim 1, wherein the output of the first switching regulator stage is coupled to the output of the second switching regulator stage through a capacitor.

10. The circuit of claim 9, wherein the output of the first switching regulator stage is selectively coupled to the output of the second switching regulator stage through the switch to short circuit the capacitor.

11. The circuit of claim 10, wherein the output node is coupled to a load, and wherein when an output current to the load falls below a threshold:
   the second switching regulator stage is turned off;
   the switch is closed; and
   a frequency of the first switching regulator stage is reduced when the switch is closed.

12. The circuit of claim 9, wherein a voltage on the output of the first switching regulator stage is greater than a voltage on the output of the second switching regulator stage.

13. The circuit of claim 1, wherein a voltage on the output of the first switching regulator stage is equal to a voltage on the output of the second switching regulator stage.

14. The circuit of claim 1, wherein the first switching regulator stage comprises:
   a first switch having a first terminal to receive a first input voltage and a second terminal coupled to a first switching node;
   a second switch having a first terminal coupled to the first switching node and a second terminal coupled to a reference voltage; and
   a first inductor having a first terminal coupled to the first switching node and a second terminal coupled to the output of the first switching regulator stage,
   and the second switching regulator stage comprising:
   a third switch having a first input terminal to receive a second input voltage and a second terminal coupled to a second switching node;
   a fourth switch having a first terminal coupled to the second switching node and a second terminal coupled to the reference voltage; and
   a second inductor having a first terminal coupled to the second switching node and a second terminal coupled to the output of the second switching regulator stage.

15. The circuit of claim 14, wherein the first switch, the second switch, the third switch, and the fourth switch are transistors.

16. The circuit of claim 14, wherein the first switch, the second switch, the third switch, and the fourth switch are MOS transistors.

17. The circuit of claim 14, further comprising a capacitor having a first terminal coupled to the second terminal of the first inductor and a second terminal coupled to the second terminal of the second inductor.

18. The circuit of claim 17, wherein the first inductor and the second inductor are inductively coupled.

19. The circuit of claim 1, further comprising a control circuit having a first input coupled to the output of the first switching regulator stage and a second input coupled to the output of the second switching regulator stage to regulate a first voltage on the output of the first switching regulator stage and to regulate a second voltage on the output of the second switching regulator stage.

20. The circuit of claim 19, wherein the control circuit comprises:
a first control circuit having an input coupled to the output of the first switching regulator stage and an output coupled to the second plurality of switches in the second switching regulator stage; and
a second control circuit having an input coupled to the output of the second switching regulator stage and an output coupled to first plurality of switches in the first switching regulator stage.

21. The circuit of claim 1, wherein the first switching regulator stage is operated at a first duty cycle and the second switching regulator stage is operated at a second duty cycle different than the first duty cycle.

22. The circuit of claim 1, wherein the first switching regulator stage and the second switching regulator stage are operated at the same duty cycle.

23. The circuit of claim 1, wherein the first switching regulator stage receives a first input voltage and the second switching regulator receives a second input voltage.

24. The circuit of claim 23, wherein the first input voltage is equal to the second input voltage.

25. The circuit of claim 23, wherein the first input voltage is less than the second input voltage, and wherein the first switching regulator stage operates at a greater frequency than the second switching regulator stage.

26. A method, comprising:
operating a first switching regulator stage at a first switching frequency, the first switching regulator stage comprising a first plurality of switches and an inductor, wherein the first switching regulator stage generates a first ripple current having a first frequency component and a second frequency component, wherein the second frequency component is less than the first frequency component; and
operating a second switching regulator stage at a second switching frequency, a second switching regulator stage comprising a second plurality of switches and an inductor, wherein an output of the first switching regulator stage and an output of the second switching regulator stage are coupled to an output node, and wherein the first switching frequency is different than the second switching frequency.

27. The method of claim 26, wherein the first switching regulator stage is operated at a first frequency and the second switching regulator stage is operated at a second frequency less than the first frequency.

28. The method of claim 27, wherein the first frequency is an integer multiple of the second frequency.

29. The method of claim 26, wherein the first switching regulator stage at least partially cancels a voltage ripple on the output node produced by the second switching regulator stage.

30. The method of claim 26, wherein the second switching regulator stage generates a second ripple current having the second frequency component, wherein the first ripple current has an opposite polarity than the second ripple current at the second frequency component so that the first ripple current at least partially cancels at least a portion of the second ripple current.

31. The method of claim 26, wherein the output node is coupled to a load, wherein the second switching regulator stage is turned off when an output current to the load falls below a threshold.

32. The method of claim 31, wherein the second switching regulator is turned on periodically to reset a voltage on a capacitor coupled between the output of the first switching regulator stage and the output of the second switching regulator stage.

33. The method of claim 26, wherein the output of the first switching regulator stage is coupled to the output of the second switching regulator stage through a capacitor.

34. The method of claim 33, wherein the output of the first switching regulator stage is selectively coupled to the output of the second switching regulator stage through a switch to short circuit the capacitor.

35. The method of claim 33, wherein a voltage on the output of the first switching regulator stage is less than a voltage on the output of the second switching regulator stage.

36. The method of claim 26, wherein the first switching regulator stage is operated at a first duty cycle and the second switching regulator stage is operated at a second duty cycle different than the first duty cycle.

37. The method of claim 26, wherein the first switching regulator stage and the second switching regulator stage are operated at the same duty cycle.

* * * * *